United States Patent [19]

Kimura et al.

[11] Patent Number: 6,133,338

[45] Date of Patent: *Oct. 17, 2000

[54] ADHESIVE AGENT BASED ON THIOURACIL DERIVATIVE

[75] Inventors: Mikio Kimura; Masayuki Aizawa, both of Tokuyama, Japan

[73] Assignee: Tokuyama Corporation, Yamaguchi-ken, Japan

[ * ] Notice: This patent is subject to a terminal disclaimer.

[21] Appl. No.: 09/129,184

[22] Filed: Aug. 4, 1998

[30] Foreign Application Priority Data

Aug. 6, 1997 [JP] Japan ................................. 9-212217

[51] Int. Cl.⁷ ................. C09J 4/00; C09K 3/00
[52] U.S. Cl. .................. 523/116; 524/493; 524/548; 524/530; 524/555; 524/560; 524/516; 524/521; 524/523; 562/227; 562/258; 562/312; 562/274; 562/317.1

[58] Field of Search ............................. 523/116; 524/493, 524/548, 530, 555, 560, 516, 521, 523; 526/227, 258, 312, 317.1, 274

[56] References Cited

U.S. PATENT DOCUMENTS 5,795,497  8/1998  Kimura et al. ..................... 252/182.18

FOREIGN PATENT DOCUMENTS 0802194  10/1997  European Pat. Off. .

*Primary Examiner*—Mark L. Warzel

[57] ABSTRACT

The present invention relates to an adhesive having high adhesiveness to a metal, especially a noble metal and a noble metal alloy. This adhesive comprises a thiouracil derivative typified by 6-methacryloyloxyhexyl 2-thiouracil-5-carboxylate, a radical-polymerizable monomer such as 2,2-bis(4-(methacryloxyethoxy)phenyl)propane, and a polymerization initiator, and as required, a filler.

10 Claims, No Drawings

ADHESIVE AGENT BASED ON THIOURACIL DERIVATIVE

BACKGROUND OF THE INVENTION

1. Field of the Invention

This invention relates to an adhesive having excellent adhesiveness to metals, especially to noble metals and noble metal alloys. The adhesive of this invention can be used in many fields such as a medical or electronic material, a precision machine and jewels, for adhering a resin to a metal, especially useful in a dental field.

2. Prior Art

For repairing teeth which are damaged by caries, etc., there has conventionally been practiced a method of adhering a metallic prosthetic material to the teeth. As adhesives for adhering such a metallic prosthetic material to the teeth, dental adhesives in which phosphoric acid ester monomers or carboxylic acid monomers disclosed in Japanese Laid-Open Patent Publication No. 21607/1983 and Japanese Laid-Open Patent Publication No. 293951/1986 are compounded have been used. In applying these adhesives, each adhering surface is pre-treated before coating each prosthetic material with the adhesive in order to increase its adhesive force. Specifically, a tooth is pretreated by an acid aqueous solution typified by phosphoric acid, and on the other hand, the surface of the prosthetic material is sandblasted to make the surface rough.

It has been confirmed that the adhesion by the above method shows an excellent adhesion to base metals such as iron, nickel, chromium, cobalt, tin, aluminum, copper and titanium, and base metal alloys containing the above metals as main components. However, adhesive forces to these noble metal alloys (alloys containing gold, platinum, palladium and silver as main components) are not sufficient. Thus, when noble metals are the object, their adhesiveness is increased by sandblasting the surfaces of noble metal alloys, and further performing the surfaces by tin plating or heating oxidation treatment.

However, procedures of such a tin plating or heating oxidation treatment are complicated. As simpler methods, there was proposed a method of coating surface treating agents containing polymerizable compounds having specified functional groups such as a compound having a thiophosphoric acid group (Japanese Laid-Open Patent Publication No. 138282/1989), a compound having a thiophosphoric acid dichloride group (Japanese Laid-Open Patent Publication No. 117595/1993), a triazinedithione derivative (83254/1989), and a mercaptothiadiazole derivative (Japanese Laid-Open Patent Publication No. 113763/1996) on the surface of a noble metal alloy which is sandblasted in advance. Thus, the procedures were simplified.

However, it is desired to develop an adhesive having sufficient adhesiveness to noble metals and noble metal alloys, which do not always need to surface-treat with a surface-treating agent.

SUMMARY OF THE INVENTION

An object of this invention is to find out an adhesive having sufficient adhesiveness to metals, especially noble metals and noble metal alloys.

As a result of extensively investigated the above problem to solve it, we have discovered that an adhesive containing a radical-polymerizable thiouracil derivative is extremely effective on the adhesiveness to a noble metal.

This invention relates to an adhesive comprising a thiouracil derivative having a radical polymerizable unsaturated bond represented by the general formula (I), a radical-polymerizable monomer, and a polymerization initiator,

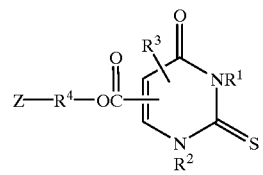

(I)

wherein $R^1$ and $R^2$ each represent a hydrogen atom or an alkyl group, at least one of $R^1$ and $R^2$ represents a hydrogen atom, $R^3$ represents a hydrogen atom, an alkyl group or a phenyl group, $R^4$ represents a divalent organic residue having 1 to 20 carbon atoms, and Z represents an organic residue having a radical polymerizable unsaturated bond.

Examples of the thiouracil derivative of general formula (I) may be those shown by general formulas (1) and (2).

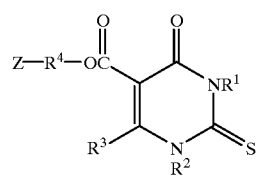

(1)

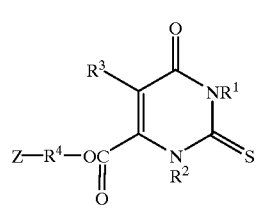

(2)

(wherein $R^1$, $R^2$, $R^3$, $R^4$ and Z are defined as before.)

The other embodiment of this invention relate to the above adhesive which further comprises a filler.

DETAILED DESCRIPTION OF THE PREFERRED EMBODIMENTS OF THE INVENTION

In the thiouracil derivatives (to be referred to as polymerizable thiouracil derivatives) represented by the general formula (I) of the invention having a radical polymerizable unsaturated bond, $R^1$ and $R^2$ each represent a hydrogen atom or an alkyl group, and at least one of $R^1$ and $R^2$ represents a hydrogen atom. Examples of the alkyl group include a methyl group, an ethyl group, a propyl group, and a butyl group.

In the general formula (I), $R^3$ represents a hydrogen atom, an alkyl group or a phenyl group. As the alkyl groups, the same groups as $R^1$ and $R^2$ may be exemplified.

Furthermore, in the general formula (I), $R^4$ may be any divalent organic residues having 1 to 20 carbon atoms without any limitation. Accordingly, they include not only divalent chain or branched chain hydrocarbon groups such as an alkylene group, but also organic groups having an ether bond, an ester bond, a siloxane bond, or a phenylene group in the main chain.

Specific examples of the group $R^4$ are shown as follows:

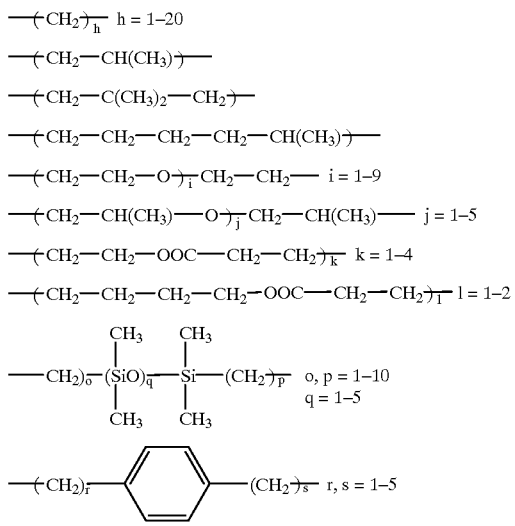

(The carbon atom at the left end in any group is bonded to the group Z and the carbon atom at the right end is bonded to the oxygen atom.)

In the general formula (I), Z represents an organic group having a radical polymerizable unsaturated bond. Z may be any group having a radical polymerizable unsaturated bond without any restriction. Specifically, Z may be methacryloyloxy group, an acryloyloxy group, a 4-vinylbenzyloxy group, a styryl group, an allyloxy group, and an allyl group. Among these groups, a methacryloyloxy group, and an acryloyloxy group are preferred in view of polymerizability and the ease of handlability.

A typical example of the polymerizable thiouracil derivatives is shown by the following general formula (I-1).

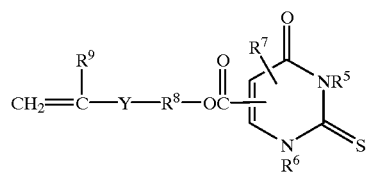

(I-1)

wherein $R^5$ and $R^6$ each represent a hydrogen atom or an alkyl group, and at least one of $R^5$ and $R^6$ represents a hydrogen atom, $R^7$ represents a hydrogen atom, an alkyl group or a phenyl group, $R^8$ represents a divalent saturated hydrocarbon group having 2 to 12 carbon atoms, —CH$_2$—C$_6$H$_4$—CH$_2$— group, or —(CH$_2$)$_O$—Si(CH$_3$)$_2$OSi(CH$_3$)$_2$—(CH$_2$)$_P$— group (0, P=1 to 5) (Carbon at the left end of a group having a siloxane bond is bonded to the group Y, and a carbon atom at the right end is bonded to an oxygen atom.), Y represents a —COO— group, a —CH$_2$O— group or a —C$_6$H$_4$—CH$_2$O— group (in any group, a carbon atom at the left end is bonded to an unsaturated carbon, and an oxygen atom at the right end is bonded to the group $R^8$), and $R^9$ represents a hydrogen atom or a methyl group.

In the present specification, —C$_6$H$_4$— means a phenylene group represented by

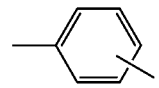

—C$_6$H$_4$— includes o-phenylene, m-phenylene and p-phenylene.

Specific examples of the thiouracil derivatives of the general formula (I-1) include those of the general formulae (3) and (4).

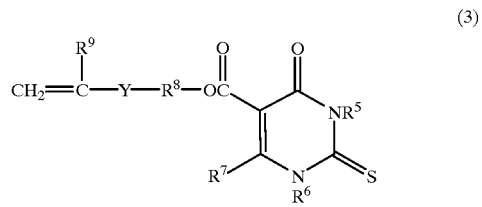

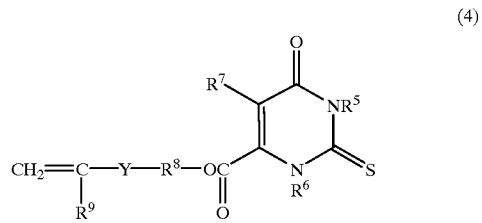

($R^5$, $R^6$, $R^7$, $R^8$, $R^9$ and Y are as described above.)

Specific examples of the polymerizable thiouracil derivatives used in this invention are given below.

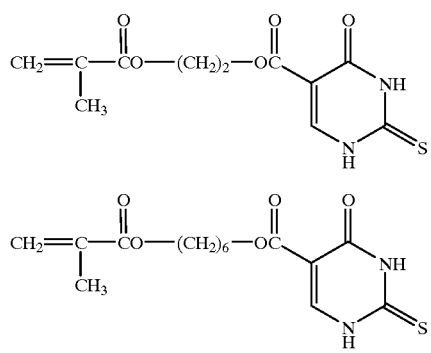

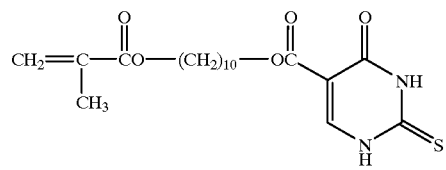
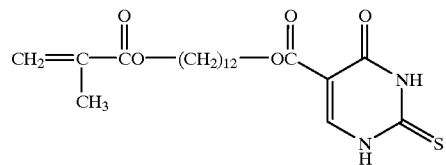
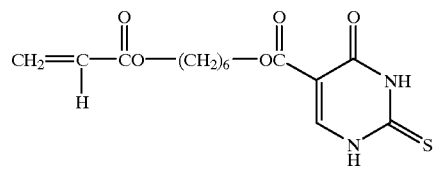
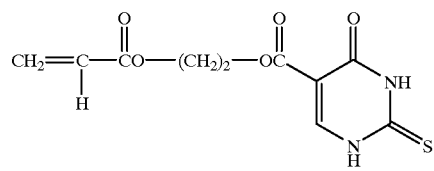
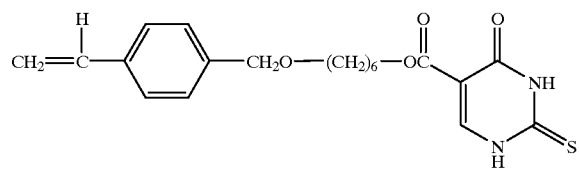
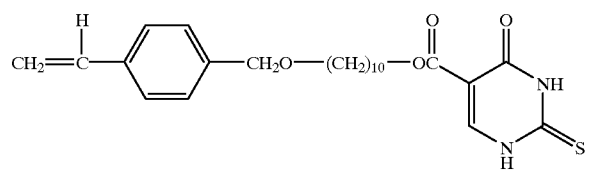
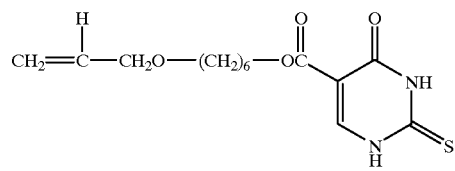
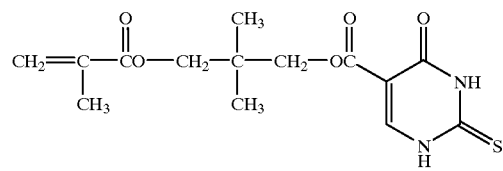
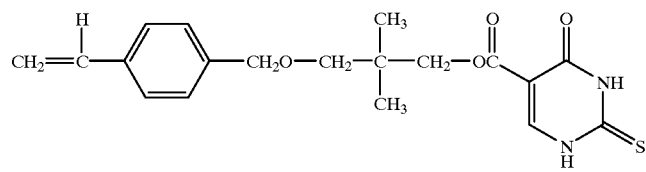
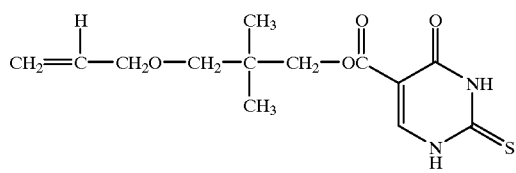

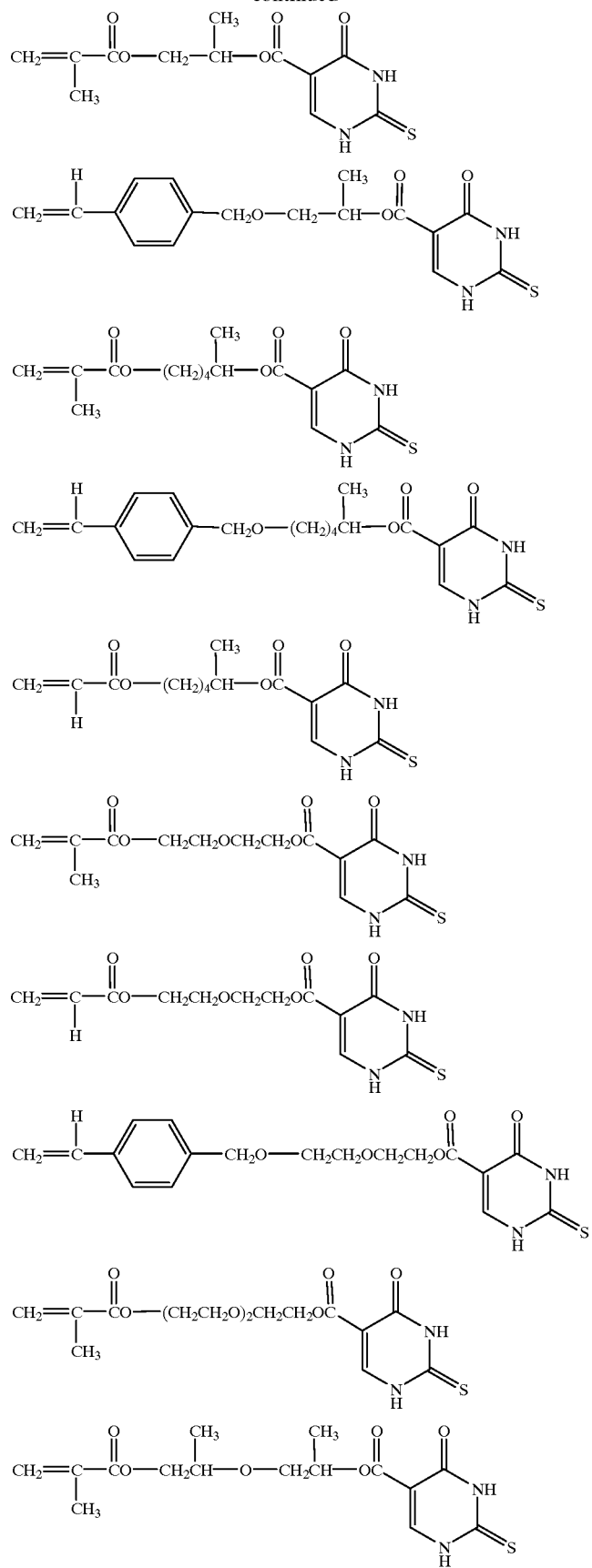

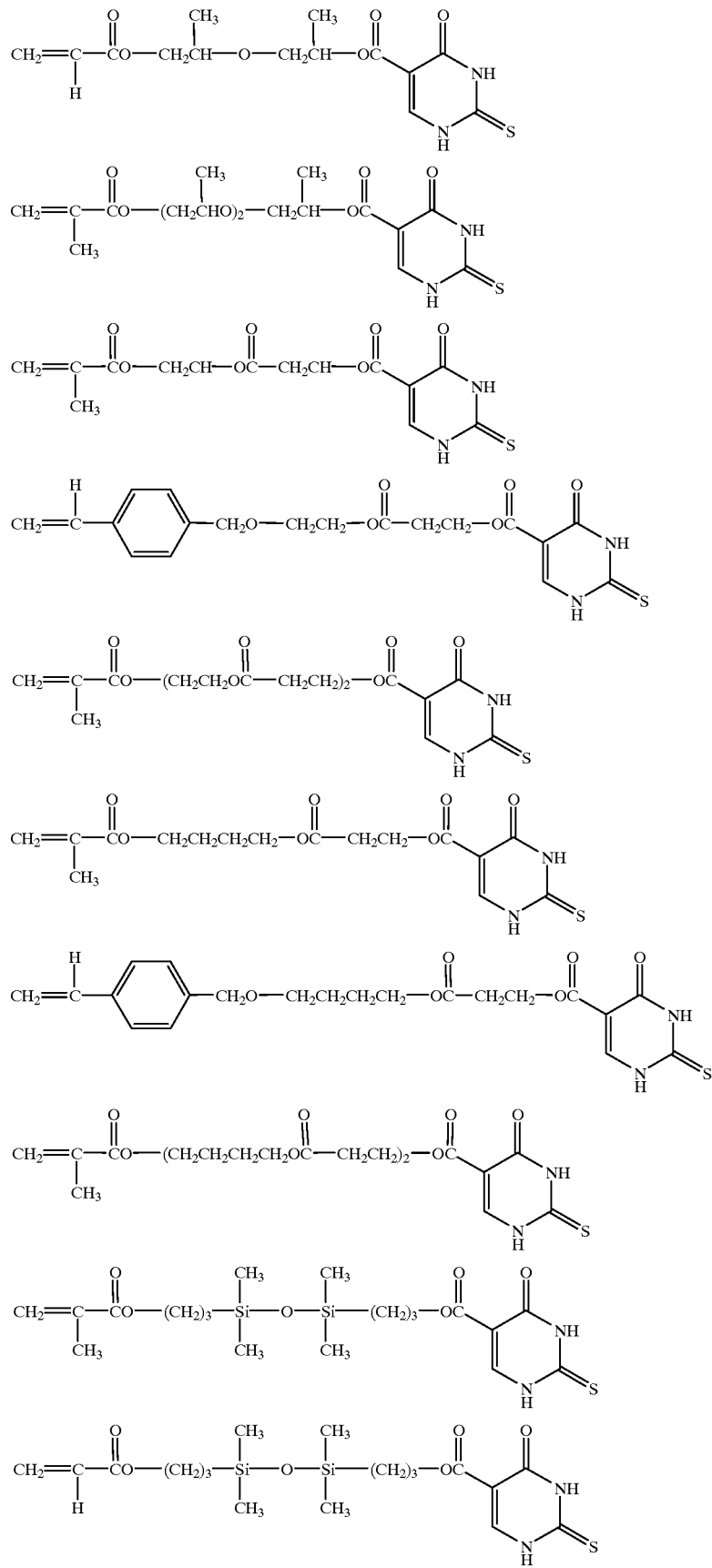

-continued
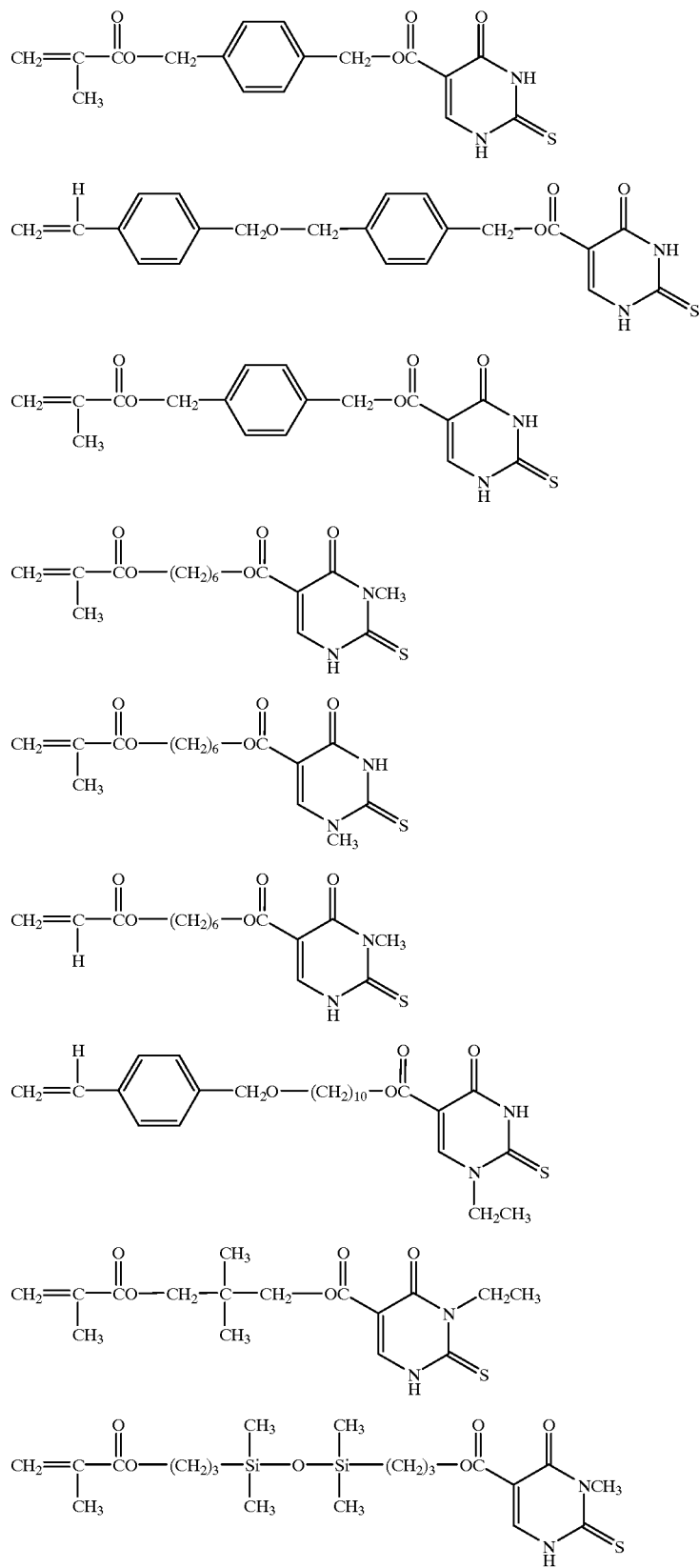

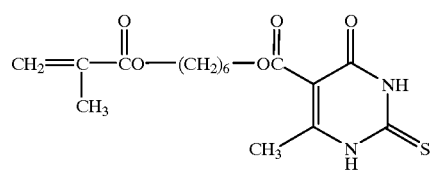
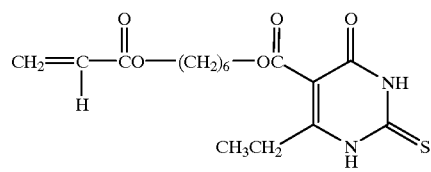
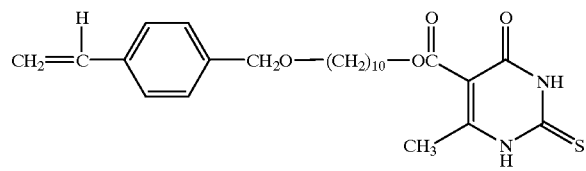
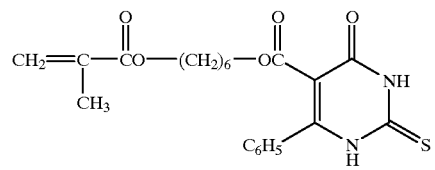
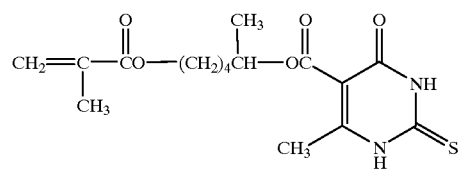
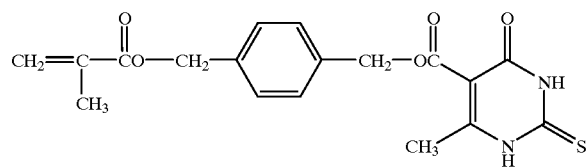
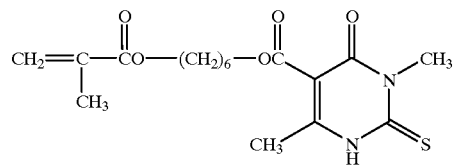
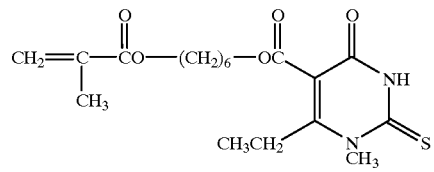
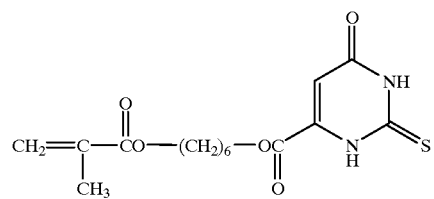

-continued

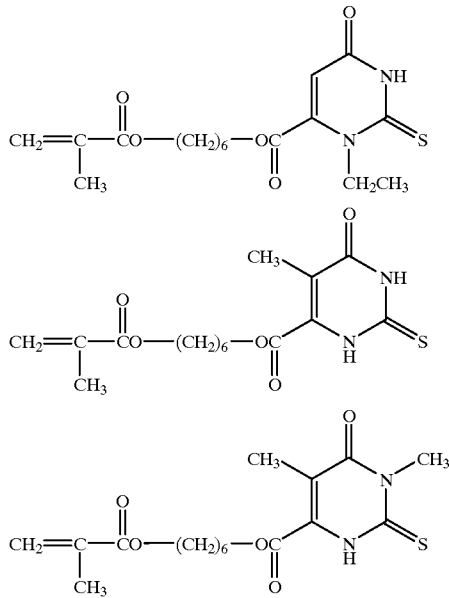

A process for producing the thiouracil derivatives of this invention shown by the general formula (I) is not specifically limited. Any method may be employed. Examples of the commercially preferred process for producing the thiouracil derivatives of general formulae (3) and (4) are as follows:

First, the process for producing the thiouracil derivative of general formula (3) will be described. A thiourea derivative shown by general formula (5)

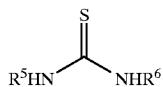
(5)

wherein $R^5$ and $R^6$ each represent a hydrogen atom or an alkyl group, and at least one of $R^5$ and $R^6$ represents a hydrogen atom, is condensed with a malonic acid derivative shown by general formula (6)

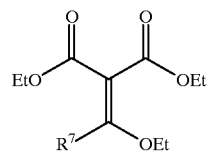
(6)

wherein $R^7$ represents a hydrogen atom, an alkyl group or a phenyl group, to give a carbethoxythiouracil derivative of the general formula (7)

(7)

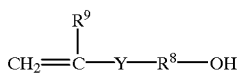

wherein $R^5$, $R^6$ and $R^7$ are the same as defined above. The carbethoxythiouracil is thereafter hydrolyzed to give a carboxythiouracil derivative shown by general formula (8).

(8)

wherein $R^5$, $R^6$ and $R^7$ are the same as defined in the above general formula, This derivative is then reacted with an alcohol having a polymerizable unsaturated bond represented by the general formula (9)

(9)

$$CH_2{=}\overset{R^9}{\underset{}{C}}{-}Y{-}R^8{-}OH$$

wherein $R^8$ represents a divalent saturated hydrocarbon group having 2 to 12 carbon atoms, or $-CH_2-C_6H_4-CH_2-$ group, or $-(CH_2)_o-Si(CH_3)_2OSi(CH_3)_2-(CH_2)_p-$ group (o, p=1 to 5) (carbon at the left end of a group having a siloxane bond is bonded to the group Y, and a carbon atom at the right end is bonded to an oxygen atom), Y is —COO— group, —CH$_2$O— group, or —C$_6$H$_4$—CH$_2$O— group (in any group, a carbon atom at the left end is bonded to an unsaturated carbon, and an oxygen atom at the right end is bonded to group R$^8$), and R$^9$ represents a hydrogen atom or a methyl group, to form a polymerizable thiouracil derivative of general formula (3).

The thiourea derivatives shown by general formula (5) may include any known compounds. For example, thiourea, methylthiourea, ethylthiourea, propylthiourea, and butylthiourea may preferably be used.

The malonic acid derivatives shown by general formula (6) can be synthesized by reacting diethyl malonate with triethyl orthocarboxylate.

Examples of triethyl orthocarboxylate may include triethyl orthoformate, triethyl orthoacetate, triethyl orthopropionate, and triethyl orthobenzoate.

More specifically, the malonic acid derivatives of general formula (6) may be obtained by charging 1 mole of diethyl malonate and 2 to 3 moles of sodium ethoxide in the presence of a solvent, and gradually adding 1 mole of triethyl orthocarboxylate dropwise.

As the alcohol having a polymerizable unsaturated bond shown by general formula (9), when Y is —COO— group, for example, those obtained by an esterification reaction between (meth)acrylic acid and a glycol, or by an esterification reaction between (meth)acryloyl chloride and a glycol can be used. When Y is a —CH$_2$O— group, for example, the alcohol obtained by reacting allyl chloride with a glycol can be used. When Y is a —C$_6$H$_4$—CH$_2$O— group, for example, the alcohol obtained by reacting 4-vinylbenzyl chloride with a glycol can be used.

Examples of the glycol include ethylene glycol, propylene glycol, pentamethylene glycol, hexamethylene glycol, octamethylene glycol, decamethylene glycol, dodecamethylene glycol, neopentyl glycol, 1,2-propane diol, 1,2-butane diol, 1,5-hexane diol, p-xylene glycol and 1,3-bis (hydroxypropyl)tetramethyldisiloxane.

Specifically, when Y is —COO— group in the general formula (9), the corresponding alcohol (9) is obtained by charging 1 mole of (meth)acrylic acid, 1 to 4 moles of a glycol, and 0.01 to 0.1 mole of an acid catalyst, and reacting these materials. The acid catalyst may preferably be p-toluenesulfonic acid and benzenesulfonic acid.

Or 1 to 4 moles of a glycol and 1 mole of a tertiary amine or a molecular sieve 3A as a dehydrohalogenation agent are charged in the presence of a solvent, and 1 mole of (meth) acryloyl chloride is gradually added dropwise to perform an esterification reaction, and then the alcohol (9) can also be obtained. Pyridine and triethylamine are preferably used as the tertiary amine.

When Y is a —CH$_2$O— group in the general formula (9), the corresponding alcohol (9) is obtained by charging 1 to 4 moles of a glycol and 1 to 1.2 moles of a basic catalyst in the presence of a solvent, and 1 mole of allyl chloride is gradually added dropwise to react the above compounds. The basic catalyst may preferably be sodium hydride.

When Y in the general formula (9) is a —C$_6$H$_4$—CH$_2$O— group, the corresponding alcohol (9) can be obtained by charging 1 to 2 moles of a glycol and 1 to 1.2 moles of a basic catalyst in the presence of a solvent, and 1 mole of 4-vinylbenzyl chloride is gradually added dropwise to react the above compounds. The basic acid may preferably be sodium hydride.

Usually, the above reaction products may be the intended mono-substituted product (9) and a di-substituted product. The mono-substituted product (9) may be separated and purified by distillation or column chromatography.

In the condensation reaction of the thiourea derivative of the general formula (5) and the malonic acid derivative of the general formula (6), the reaction mole ratio of the malonic acid derivative of the general formula (6) to the thiourea derivative of the general formula (5) may preferably be 0.5 to 1.5 mole. The reaction catalysts used in this reaction may be any known substances. One example may be sodium ethoxide, and its amout may preferably be 0.5 to 1.5 mole times based on the thiourea derivative of the general formula (5).

An example of the solvent used in the above reaction may include ethanol. The reaction temperature may be selected from 40 to 80° C., preferably 60 to 80° C. The reaction time may not be particularly limited, and generally, it is selected from about 1 to 10 hours. The reaction time may be determined by relation to the reaction temperature.

After the reaction, the precipitated salt is dissolved in water, and an acid is added to acidify the solution, whereby the carbethoxythiourcil derivative shown by general formula (7) is obtained.

When in the thiourea of general formula (5), any of R$^5$ and R$^6$ represents an alkyl group, the carbethoxythiourcil derivative of general formula (7) may be obtained as a mixture of isomers due to substitution position on N atom of the alkyl group. These compounds may be separated and purified by column chromatography.

In the hydrolysis of the carbethoxythiouracil derivative of the general formula (7) obtained by the reaction of the thiourea derivative of the general formula (5) with the malonic acid derivative of the general formula (6), the used reaction agents may be any known agents. However, a dimethyl sulfoxide solution of potassium tert-butoxide is preferably used.

The amount of the reaction agent is preferably 6 to 20 mole times, preferably 12 to 16 mole times, based on the carbethoxythiouracil derivative. The reaction temperature may be selected from room temperature to 80° C., preferably room temperature to 40° C. The reaction time is not particularly limited, but generally it may be selected from 1 to 24 hours, and it may be determined in relation to the reaction temperature.

After the reaction, water is added to the reaction mixture, and furthermore, an acid is added to acidify the solution whereby the carboxythiouracil derivative shown by the general formula (8) is obtained.

In the esterification reaction between the carboxythiouracil derivative shown by the general formula (8) and the alcohol having a polymerizable unsaturated bond shown by the general formula (9), the reaction mole ratio of the alcohol having a polymerizable unsaturated bond expressed by the general formula (9) to the carboxythiouracil derivative expressed by the general formula (8) may be 1 to 5, but preferably 1 to 3.

Examples of the esterification catalyst used at this time include p-toluene sulfonic acid, benzenesulfonic acid, and N, N'-dicyclohexylcarbodiimide. The amount of such a reaction catalyst may preferably be 0.1 to 1 mole times to the carboxythiouracil derivative.

Examples of the solvent used in the above reaction include tetrahydrofuran, acetone and toluene. Preferably, it is preferred to add a small amount of a polymerization inhibitor such as hydroquinone, hydroquinone monomethyl ether, or butylhydroxytoluene.

The reaction temperature may be selected from room temperature to 80° C., preferably room temperature to 70° C. The reaction time may not particularly be limited, and generally, may be selected from 1 to 50 hours. The reaction time may be determined so that in relation to the reaction temperature, the reacted material does not polymerize.

After the reaction, the precipitated material is filtered, the solvent is distilled under reduced pressure, and the concentrate is passed through a silica gel column using an inert solvent such as ethyl acetate, and is separated and purified to give a product having a high purity.

Next, a process for producing the polymerizable thiouracil derivative shown by general formula (4) will be explained.

A thiourea derivative of the general formula (5)

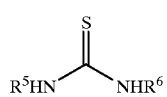

(5)

wherein $R^5$ and $R^6$ are the same as described above, is condensed with a succinic acid derivative shown by the general formula (10)

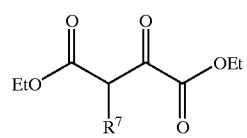

(10)

wherein $R^7$ represents a hydrogen atom, an alkyl group or a phenyl group, to give a carbethoxythiouracil derivative shown by the general formula (11)

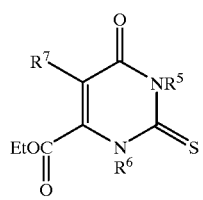

(11)

wherein $R^5$, $R^6$ and $R^7$ are the same as defined above, and thereafter the carbethoxythiouracil derivative is hydrolyzed to give a carboxy thiouracil derivative of the general formula (12).

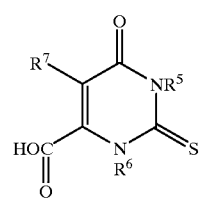

(12)

wherein $R^5$, $R^6$ and $R^7$ are the same as defined in the above general formula, Then, this carboxythiouracil derivative and the alcohol having a polymerizable unsaturated bond shown by the general formula (9) are reacted to give a polymerizable thiouracil derivative of the general formula (4) described above.

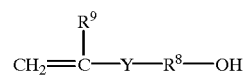

(9)

wherein $R^8$ represents a divalent saturated hydrocarbon group having 2 to 12 carbon atoms, or —$CH_2$—$C_6H_4$—$CH_2$— group, or —$(CH_2)_o$—$Si(CH_3)_2OSi(CH_3)_2$—$(CH_2)_p$— group (o, p=1 to 5) (carbon at the left end of a group having a siloxane bond is bonded to the group Y, and a carbon atom at the right end is bonded to an oxygen atom), Y is —COO— group, —$CH_2O$— group, or —$C_6H_4$—$CH_2O$— group (in any group, a carbon atom at the left end is bonded to an unsaturated carbon, and an oxygen atom at the right end is bonded to group $R^8$), and $R^9$ represents a hydrogen atom or a methyl group, As the thiourea derivative shown by the general formula (5), the same known compounds used to produce the compounds of the general formula (3) may be used without limitations.

The succinic acid derivatives shown by the general formula (10) may be any known compounds without limitation. For example, diethyl 2-oxosuccinate, diethyl 2-methyl-2'-oxosuccinate, diethyl 2-ethyl-2'-oxosuccinate, and diethyl 2-butyl-2'-oxosuccinate may preferably be used.

The alcohols having a polymerizable unsaturated bond shown by the general formula (9) may be the same compounds as used in the production of compounds having the general formula (3).

In the condensation reaction of the thiourea derivative of the general formula (5) with the succinic acid derivative of the general formula (10), the reaction mole ratio of the succinic acid derivative shown by the general formula (10) with respect to the thiourea derivative shown by the general formula (5) is preferably 0.5 to 1.5 moles.

The reaction catalyst used at this time may be any known compounds. Sodium ethoxide, and the like can be cited as an example. The amount of the reaction catalyst added is preferably 0.5 to 1.0 mole times with respect to the thiourea derivative of the general formula (5).

The solvent used in this reaction may be ethanol, and the like. The reaction temperature may be selected from 40 to 80° C., preferably 60 to 80° C. The reaction time may not particularly be limited, and generally it can be selected from about 1 to 10 hours, and it may be determined with regard to the reaction temperature.

After the reaction, the precipitated salt is dissolved in water and an acid is added to acidify the solution to give a carbethoxythiouracil derivative shown by the general formula (11).

In thiourea shown by the general formula (5), when one of $R^5$ and $R^6$ represents an alkyl group, the carbethoxythiouracil derivative shown by the general formula (11) can be obtained as a mixture of isomers according to substitution position on an N atom of the alkyl group. These compounds can be separated and purified by column chromatography.

The hydrolysis of the carbethoxythiouracil derivative of the general formula (11) obtained by reacting the thiourea derivative shown by the general formula (5) with the succinic acid derivative shown by the general formula (10) can be carried out in the same way as in the case of the carbethoxythiouracil derivative expressed by the general formula (7).

The reaction of the carboxythiouracil derivative shown by the general formula (12) with the alcohol having a polymerizable unsaturated bond shown by the general formula (9) can be carried out in the same way as in the reaction between the carboxythiouracil derivative shown by the general formula (8) and the alcohol havng a polymerizable unsaturated bond shown by the general formula (9).

The compounding amount of the polymerizable thiouracil derivative used in the adhesive of this invention is not particularly restricted. From the standpoint of the adhesive strength, the compounding amount of the thiouracil derivative is preferably 0.005 to 30 parts by weight, more preferably 0.01 to 10 parts by weight, especially preferably 0.05 to 5 parts by weight, per 100 parts by weight of the radical polymerizable monomer. If the compounding amount of the polymerizable thiouracil derivative is too much or too little, the adhesive strength to a noble metal and a noble metal alloy becomes small.

In the adhesive of this invention, a radical polymerizable monomer is compounded. The radical polymerizable monomer is not particularly restricted. As the radical polymerizable monomer, known monofunctional or polyfunctional radical polymerizable monomers, or known radical polymerizable monomers having an acidic group (hereinafter, named by "polymerizable monomers having an acidic group") can be used.

In the above radical polymerizable monomer, examples of a group having a radical polymerizable unsaturated bond include a methacryloyloxy group, an acryloyloxy group, a methacrylamide group, an acrylamide group, a styryl group, and an allyl group. Among these, (meth)acrylate type polymerizable monomers having a methacryloyloxy group or an acryloyloxy group are preferred in view of polymerizability, adhesive property and the ease of handling.

Specific examples of monofunctional radical-polymerizable monomers used generally preferably include monofunctional (meth) acrylate-type monomers such as methyl (meth)acrylate, ethyl (meth)acrylate, n-propyl (metha)acrylate, isopropyl (meth)acrylate, n-butyl (meth) acrylate, isobutyl (meth)acrylate, n-hexyl (meth)acrylate, 2-ethyhexyl (meth)acrylate, tridecyl (meth)acrylate, stearyl (meth)acrylate, 2-hydroxyethyl (meth)acrylate, 2-hydroxypropyl (meth)acrylate, glycidyl (meth)acrylate and methoxydiethyleneglycol (meth)acrylate; monofunctional (meth)acrylamide-type monomers such as N-methylol (meth)acrylamide; and monofunctional styrene-type monomers such as styrene and α-methylstyrene.

Examples of polyfunctional radical-polymerizable monomers generally preferably used include aromatic difunctional (meth)acrylate type monomers such as 2,2-bis(4-(3-(meth)acryloyloxy-2-hydroxypropoxy)phenyl)propane, 2,2'-bis(4-(meth)acryloyloxyphenyl)propane, 2,2-bis(4-(meth)acryloyloxyethoxyphenyl)propane, 2,2-bis(4-(meth) acryloyloxydiethoxyphenyl)propane, 2,2-bis(4-(meth) acryloyloxy tetraethoxyphenyl)propane, 2,2-bis(4-(meth) acryloyloxypentaethoxyphenyl)propane, 2,2-bis(4-(meth) acryloyloxydipropoxyphenyl)propane, 2-(4-(meth) acryloyloxyethoxyphenyl)-2-(4-(meth) acryloyloxydiethoxyphenyl)propane, 2-(4-(meth) acryloyloxydiethoxy-phenyl)-2-(4-(meth) acryloyloxytriethoxyphenyl)propane, 2-(4-(meth) acryloyloxydi-propoxyphenyl)-2-(4-(meth) acryloyloxytriethoxyphenyl)propane, 2,2-bis(4-(meth)-acryloyloxyisopropoxyphenyl)propane and 1-(meth) acryloyloxymethyl-2-(meth)acryloyloxyethyl hydrogen maleate; aliphatic difunctional (meth)acrylate-type monomers such as ethylene glycol di(meth)acrylate, diethylene glycol di(meth)acrylate, triethylene glycol di(meth)acrylate, butylene glycol di(meth)acrylate, neopentyl glycol di(meth) acrylate, propylene glycol di(meth)acrylate, 1,3-butanediol di(meth)acrylate, 1,4-butanediol di(meth)acrylate, 1,6-hexanediol di(meth)acrylate, glycerine di(meth)acrylate, di-2-(meth)acryloyloxyethyl-2,2,4-trimethylhexamethylene dicarbamate and N,N'-methylenebis(meth)acrylamide; difunctional (meth)acrylamide-type monomers such as N,N'-methylene(bis)acrylamide; difunctional styrene-type monomers such as divinylbenzene and α-methylstyrene dimer; difunctional allyl-type monomers such as diallyl phthalate and diallyl carbonate; trifunctional (meth)acrylate-type monomers such as trimethylol propane tri(meth) acrylate and trimethylolethane tri(meth)acrylate; and tetrafunctional (meth)acrylate-type monomers such as pentaerythritol tetra(meth)acrylate.

The polymerizable monomers having an acidic group may not be limited to any polymerizable monomers having at least one acidic group and at least one polymerizable unsaturated group per molecule, but any known compounds may be used.

The acidic groups may preferably include a phosphoric acid group, a carboxylic acid group, a carboxylic anhydride group, and a sulfonic acid group. Polymerizable monomers having a phosphoric acid group, a carboxylic acid group, an anhydric carboxylic acid group, and a sulfonic acid group are shown by the general formula (13).

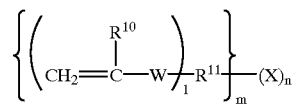

(13)

wherein $R^{10}$ represents a hydrogen atom and a methyl group, W represents an oxycarbonyl group (—COO—), an amide group (—CONH—), or a phenylene group ('$C_6H_4$—), $R^{11}$ represents a bond, or a divalent to hexavalent organic residue having 1 to 30 carbon atoms which may have an ether bond and/or an ester bond, X is a group having a phosphoric acid group, a carboxylic acid group, a carboxylic anhydride group, or a sulfonic acid group, 1 is an integer of 1 to 4, m and n represent an integer of 1 or 2, with the proviso that when $R^{11}$ is divalent, Q is 1, m and n are 1 or 2; when $R^{11}$ is trivalent, Q, m and n are 1 or 2; when $R^{11}$ is tetravalent, Q is 2 or 3, m and n are 1 or 2; when $R^{11}$ is pentavalent, Q is 3 or 4, m and n are 1 or 2; and when $R^{11}$ is hexavalent, Q is 4, m is 2, n is 1 or 2; and that when W is an oxycarbonyl group or an amide group, $R^{11}$ does not become a bond.

In the general formula (13), X represents a group having a phosphoric acid group, a carboxylic acid group, a carboxylic anhydride group, or a sulfonic acid group, and its structure is not particularly limited. Preferred examples of the above structure of the X groups are as follows;

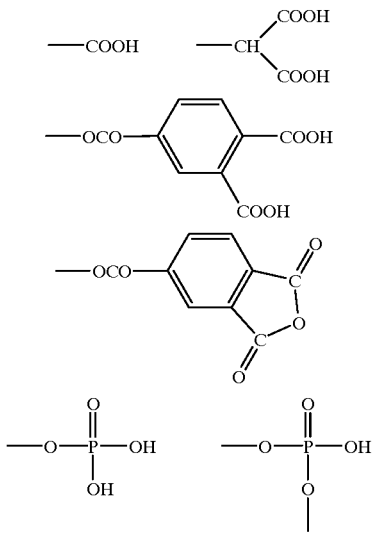

-continued

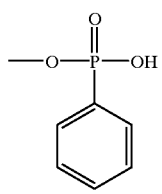 

The structure of $R^{11}$ in the general formula (13) is not particularly limited, and a bond or a divalent to hexavalent known organic residue having 1 to 30 carbon atoms which may have a ether bond and/or a ester bond may be employed. The above organic residues are specifically exemplied as follows. The case of $R^{11}$ is a bond means that a group W and a group X are bonded directly. When W is an oxycarbonyl group or an amide group, $R^{11}$ does not become a bond but becomes the above organic residue.

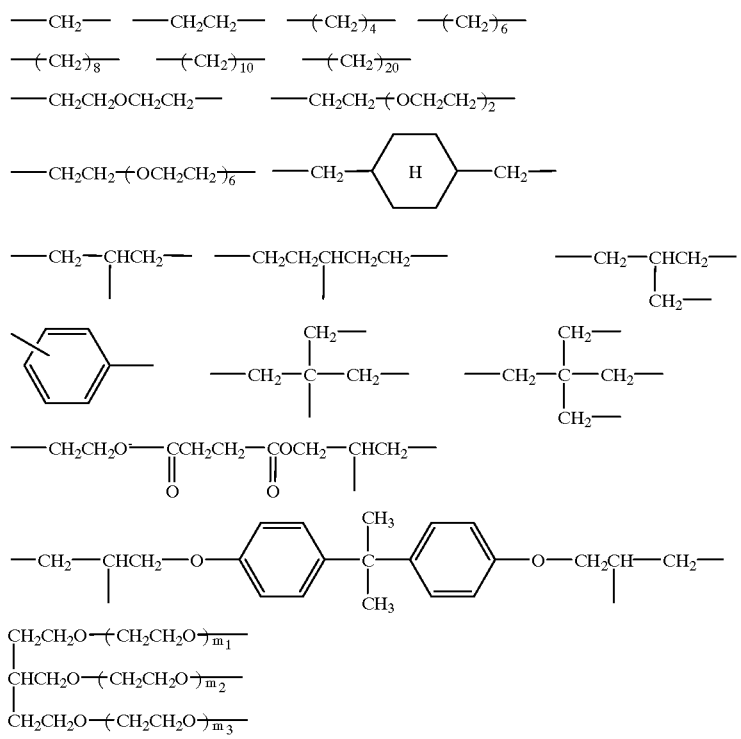

Preferred specific examples of the polymerizable monomers having an acidic group expressed by the general formula (13) are as follows.

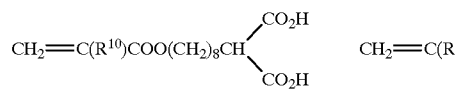 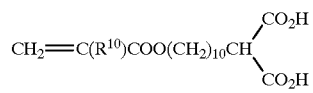 

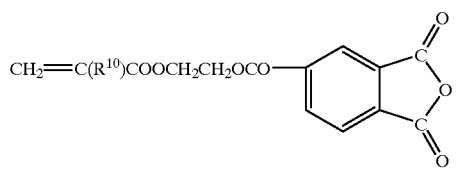 

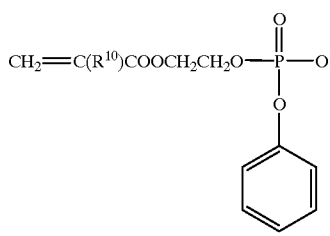 

-continued

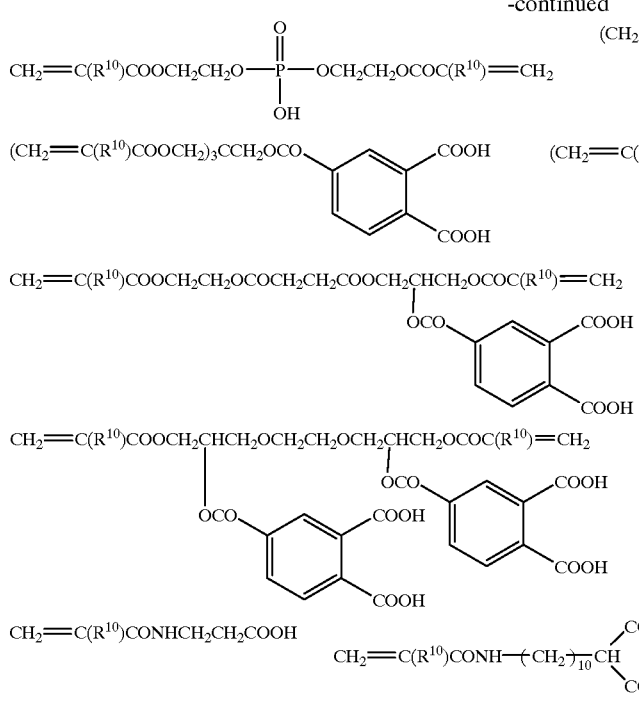
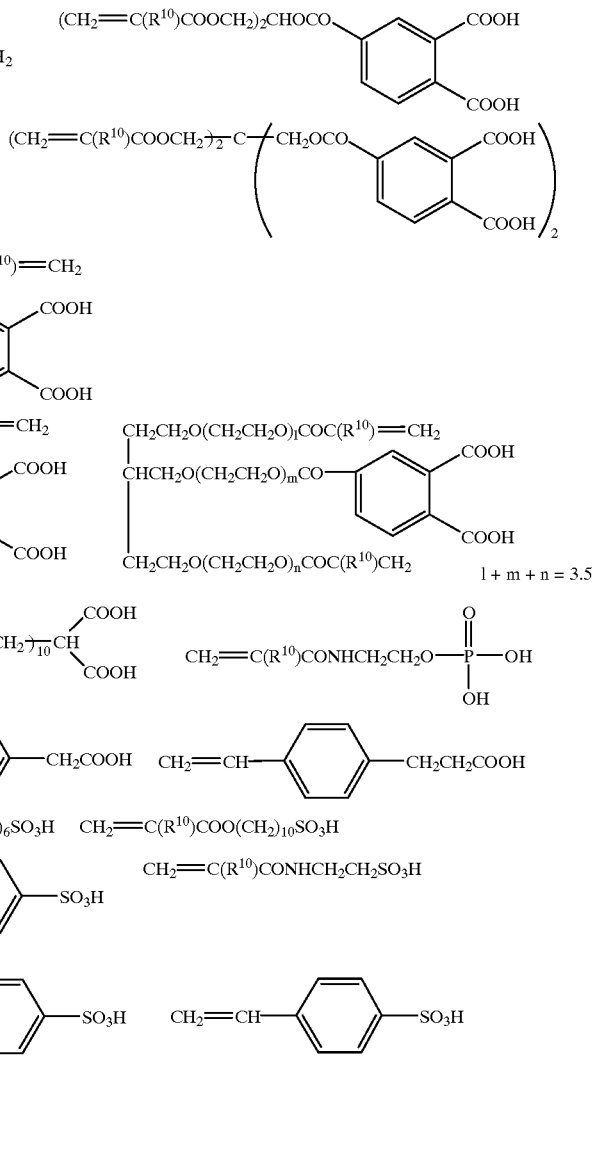

(However, $R^{10}$ represents a hydrogen atom or a methyl group.)

Elsewhere, vinylphosphonic acids in which a phosphonic acidic group is directly bonded to the vinyl group, or acrylic acid, methacrylic acid, and vinylsulfonic acid, and the like can be cited as polymerizable monomers having an acidic group.

The above-mentioned radical polymerizable monomers may be used singly or as a mixture of two or more kinds. Especially, when the adhesive of this invention is used as a dental resin cement requiring adhesiveness to a hard tissue of a living body such as teeth or to a base metal at the same time as adhesion to the noble metal, it is preferred to compound a polymerizable monomer having an acidic group in a part of a radical polymerizable monomer. In this case, the polymerizable monomer having an acidic group should be compounded in an amount of 10 parts by weight to 50 parts by weight, especially in an amount of 15 parts by weight to 40 parts by weight, based on the total radical-polymerizable monomer.

In the adhesive of this invention, a polymerizable initiator is compounded. This polymerization initiator may include any known radical-polymerizable initiators capable of polymerizing the above-mentioned radical-polymerizable monomers.

Typical polymerization initiators include chemical polymerization initiators such as an organic peroxide and an amine, an organic peroxide, an amine and a sulfinic acid salt, an acidic compound and an aryl borate, barbituric acid and alkylborane, and photopolymerization initiators such as aryl borates and photo acid generator agent, α-diketones and tertiary amines, thioxanthones, tertiary amines and α-aminoacetophenones.

Examples of the organic peroxides include t-butylhydroperoxide, cumene hydroperoxide, di-t-butyl peroxide, dicumyl peroxide, acetyl peroxide, lauroyl peroxide, and benzoyl peroxide. These compounds may be used singly or as a mixture of at least two compounds.

Preferred amines are secondary or tertiary amines in which an amino group is bonded to an aryl group. Specific examples include N-methylaniline, N-methyl-p-toluidine, N,N-dimethylaniline, N,N-diethylaniline, N,N-di-n-butylaniline, N,N-dibenzylaniline, N,N-dimethyl-p-toluidine, N,N-diethyl-p-toluidine, N,N-dimethyl-m-toluidine, p-bromo-N,N-dimethylaniline, m-chloro-N,N-dimethylaniline, p-dimethylaminobenzaldehyde, p-dimethylaminoacetophenone, p-dimethylaminobenzoic acid, ethyl p-dimethylaminobenzoate, amyl p-dimethylaminobenzoate, N,N-dimethylanthranilic acid, methyl ester, N,N-dihydroxyethylaniline, N,N-dihydroxyethyl-p-toluidine, p-dimethylaminophenethyl alcohol, p-dimethylaminostilbene, N,N-dimethyl-3,5-xylidine, 4-dimethylaminopyridine, N,N-dimethyl-α-naphthylamine, N,N-dimethyl-β-naphthylamine, tributylamine, tripropylamine, triethylamine, N-methyldiethanolamine, N-ethyldiethanolamine, N,N-dimethylhexylamine, N,N-dimethyldodecylamine, N,N-dimethylstearylamine, N,N-dimethylaminoethyl methacrylate, N,N-diethylaminoethyl methacrylate, and 2,2'-(n-butylimino)diethanol. These compounds may be compounded singly or as a mixture of at leas two compounds.

Examples of the sulfinate salts may include sodium benzenesulfinate, lithium benzenesulfinate, sodium p-toluenesulfinate, lithium p-toluenesulfinate, potassium p-toluenesulfinate, sodium m-nitrobenzenesulfinate, and sodium p-fluorobenzenesulfinate.

Examples of the aryl borates include tetraphenyl borate, tetra(p-fluorophenyl) borate, tetra(p-chlorophenyl) borate, trialkyl(p-fluorophenyl) borates, trialkyl(3,5-bistrifluoromethyl) phenyl borates, dialkyldiphenyl borates, dialkyldi(p-chlorophenyl) borates, dialkyldi(p-fluorophenyl) borates, dialkyldi(3,5-bistrifluoromethyl) phenylborates, monoalkyl triphenylborates, monoalkyltri(p-chlorophenyl) borates, monoalkyltri(p-fluorophenyl) borates, monoalkyltri(3,5-bistrifluoromethyl) phenyl borates (the alkyl groups include an n-butyl group, an n-octyl group, and an n-dodecyl group); the above compounds may be a sodium salt, a lithium salt, a potassium salt, a magnesium salt, a tetrabutyl ammonium salt, and a tetramethylammonium salt.

The barbituric acid include 5-butylbarbituric acid and 1-benzyl-5-phenyl-barbituric acid.

Examples of the alkylborane preferably include tributyl borane and its partial oxide.

Examples of the photo acid generators include halomethyl group-substituted s-triazine derivatives such as 2,4,6-tris(trichloromethyl)-s-triazine, 2,4,6-tris(tribromomethyl)-s-triazine, 2-methyl-4,6-bis(trichloromethyl)-s-triazine, 2-methyl-4,6-bis(tribromomethyl)-s-triazine, 2-phenyl-4,6-bis(trichloromethyl)-s-triazine, 2-(p-methoxyphenyl)-4,6-bis(trichloromethyl)-s-triazine, 2-(p-methylthiophenyl)-4,6-bis(trichloromethyl)-s-triazine, 2-(p-chlorophenyl)-4,6-bis(trichloromethyl)-s-triazine, 2-(2,4-dichlorophenyl)-4,6-bis(trichloromethyl)-s-triazine, 2-(p-bromophenyl)-4,6-bis(trichloromethyl)-s-triazine, 2-(p-tolyl)-4,6-bis-(trichloromethyl)-s-triazine, 2-(p-methoxyphenyl)-4,6-bis(trichloromethyl)-s-triazine, 2-n-propyl-4,6-bis(trichloromethyl)-s-triazine, 2-(α, α, β-trichloroethyl)-4,6-bis(trichloromethyl)-s-triazine, 2-styryl-4,6-bis(trichloromethyl)-s-triazine, 2-(p-methoxystyryl)-4,6-bis(trichloromethyl)-s-triazine, 2-(o-methoxystyryl)-4,6-bis-(trichloromethyl)-s-triazine, 2-(p-butoxystyryl)-4,6-bis-(trichloromethyl)-s-triazine, 2-(3,4-dimethoxystyryl)-4,6-bis(trichloromethyl)-s-triazine and 2-(3,4,5-trimethoxystyryl)-4,6-bis(trichloromethyl)-s-triazine; and diphenyl iodonium salt compounds such as diphenyl iodonium, bis-(p-chlorophenyl)iodonium, ditolyliodonium, bis(p-tert-butylphenyl)iodonium, bis(m-nitrophenyl) iodonium, p-tert-butylphenylphenyl iodonium, methoxyphenylphenyl iodonium, and p-octyloxyphenylphenyl iodonium in the form of chloride, bromide, tetrafluoroborate, hexafluorophosphate, hexafluoroarsenate, hexafluoroantimonate and trifluoromethane sulfonate, It is preferred to add coumarine-type dyes capable of sensitizing and decomposing the above photo acid generators. Examples of the preferably used coumarine-type dyes include 3-thienoyl coumarine, 3-(4-methoxybenzoyl) coumarine, 3-benzoylcoumarine, 3-(4-cyanobenzoyl) coumarine, 3-thienoyl-7-methoxycoumarine, 7-methoxy-3-(4-methoxybenzoyl)coumarine, 3-benzoyl-7-methoxycoumarine, 3-(4-cyanobenzoyl)-7-methoxycoumarine, 5,7-dimethoxy-3-(4-methoxybenzoyl) coumarine, 3-benzoyl-5,7-dimethoxycoumarine, 3-(4-cyanobenzoyl)-5,7-dimethoxycoumarine, 3-acetyl-7-dimethylaminocoumarine, 7-diethylamino-3-thienoylcoumarine, 7-diethylamino-3-(4-methoxybenzoyl)-coumarine, 3-benzoyl-7-diethylaminocoumarine, 7-diethylamino-3-(4-cyanobenzoyl)coumarine, 7-diethylamino-3-(4-dimethylaminobenzoyl)coumarine, 3-cinnamoyl-7-diethylaminocoumarine, 3-(p-diethylaminocinnamoyl)-7-diethylaminocoumarine, 3-acetyl-7-diethylaminocoumarine, 3-carboxy-7-diethyl aminocoumarine, 3-(4-carboxybenzoyl)-7-diethylaminocoumarine, 3,3'-carbonylbis coumarine, 3,3'-carbonylbis(7-diethylamino)coumarine, 2,3,6,7-tetrahydro-1,1,7,7-tetramethyl-10-(benzothiazoyl)-11-oxo-1H,5H,11H-[1]benzopyrano[6,7,8-ij]-quinolizine, 3,3'-carbonylbis(5,7-dimethoxy)-3,3'-biscoumarine, 3-(2'-benzimidazoyl)-7-diethylaminocoumarine, 3-(5-benzoxazoyl)-7-diethylaminocoumarine, 3-(5'-phenylthiadiazoyl-2')-7-diethylaminocoumarine, 3-(2'-benzothiazoyl)-7-diethylaminocoumarine and 3,3'-carbonylbis(4-cyano-7-diethylamino)coumarine.

The α-Diketones preferably used include camphorquinone, benzil, α-naphthil, acetonaphthene, naphthoquinone, p,p'-dimethoxybenzil, p,p'-dichlorobenzil, 1,2-phenanthrenequinone, 1,4-phenanthrenequinone, 3,4-phenanthrenequinone and 9,10-phenanthrenequinone.

The thioxanthones include 2-chlorothioxanthone and 2,4-diethylthioxanthone.

The α-aminoacetophenones include 2-benzyl-dimethylamino-1-(4-morpholinophenyl)-butanone-1;2-benzyl-diethylamino-1-(4-morpholinophenyl)-butanone-1;2-benzyl-dimethylamino-1-(4-morpholinophenyl)-propanone-1;2-benzyl-diethylamino-1-(4-morpholinophenyl)-propanone-1;2-benzyl-dimethylamino-1-(4-morpholinophenyl)-pentanone-1;2-benzyl-diethylamino-1-(4-morpholinophenyl)-pentanone-1.

These polymerization initiators may be used singly or as mixtures. The compounded amounts of the polymerization initiators are not limited especially, but may preferably 0.01 to 10.parts by weight, more preferably 0.1 to 5 parts by weight, per 100 parts by weight of the radical-polymerizable monomer.

It is preferred to compound a filler in the adhesive of this invention from the viewpoint of increasing the mechanical strength and water-proof property of a hardened product of the adhesive of this invention. By compounding the filler, the viscosity or the flowability of the adhesive can be regulated. As this filler, any known organic and inorganic fillers may be used without any particular limitation.

Examples of the organic fillers may include polymethyl methacrylate, polyethyl methacrylate, methyl methacrylate/ ethyl methacrylate copolymer, ethyl methacrylate/butyl methacrylate copolymer, methyl methacrylate/trimethylolpropane trimethacrylate copolymer, polyvinyl chloride, polystyrene, chlorinated polyethylene, nylons, polysulfones polyether sulfons and polycarbonate.

Examples of the inorganic fillers may include quartz, amorphous silica, silica zirconia, fluoroaluminosilicate, clay, aluminum oxide, talc, mica, kaolin, glass, barium sulfate, zirconium oxide, titanium oxide, silicon nitride, aluminum nitride, titanium nitride, silicon carbide, boron carbide, calcium carbonate, hydroxyapatite and calcium phosphate.

These inorganic fillers may desirably be treated with a surface treating agent typified by silane coupling agents to increase intimacy with the polymerizable monomer, or to increase the mechanical strength or water-proof property. The surface treatment may be carried out by a known method. Preferably, the silane coupling agents include methyltrimethoxysilane, methyltriethoxysilane, methyltrichlorosilane, dimethyldichlorosilane, trimethylchlorosilane, vinyltrimethoxysilane, vinyltriethoxysilane, vinyltrichlorosilane, vinyltriacetoxysilane, vinyltris β-methoxy ethoxy)silane, γ-methacryloyloxypropyltrimethoxysilane, γ-methacryloyloxypropyl-tris (β-methoxyethoxy) silane, γ-chloropropyltrimethoxysilane, γ-chloropropylmethyldimethoxysilane, γ-glycidoxypropyltrimethoxysilane, β-glycidoxypropylmethyldiethoxysilane, β-(3,4-epoxycyclohexyl)ethyltrimethoxysilane, N-phenyl-γ-aminopropyltrimethoxysilane and hexamethyldisilazane.

Inorganic organic composite fillers obtained by pulverizing a composite body which is obtained by curing the mixture which of above various inorganic fillers and radical polymerizable monomer, may preferably be used.

The shape of these fillers is not particularly limited, and may be pulverized fillers or spherical fillers. The particle diameter of the fillers is not particularly limited, but with respect to their operability, these fillers may have a particle diameter of 100 μm or below.

The compounded amount of the filler may be suitably determined according to the desired viscosity, mechanical strength, etc. Especially where the cured body of the adhesive requires a mechanical strength, it is desirable to add the filler preferably in an amount of 100 to 1200 parts by weight, more preferably in an amount of 300 to 1000 parts by weight, per 100 parts by weight of the radical-polymerizable monomer.

In the adhesive of this invention, as required, a polymerization inhibitor such as hydroquinone, hydroquinonemonomethylether or butylhydroxytoluene or an ultraviolet absorber, a pigment, an organic solvent and a thickener may be added in such a range which does not decrease the properties of the adhesive. The organic solvent includes alcohols such as ethanol, 2-propanol, methyleneglycol and diethyleneglycol, ketones such as acetone and methyl ethyl ketone, and hexane, toluene, dichloromethane and ethyl acetate. These organic solvents may be used as mixtures as required.

In the adhesive of this invention, it is not necessary to include all components in the same package. For example, when the polymerizable thiouracil derivative, the radical-polymerizable monomer, the polymerization initiator and the filler are used as components, the form of the package may be properly determined under such a condition that the storage stability may not be impaired. For example, a paste composed of the polymerizable thiouracil derivative, the radical-polymerizable monomer, the polymerization initiator and the filler and a paste composed of the radical-polymerizable monomer, the polymerization initiator and the filler may be separately wrapped, and in use, these pastes may be mixed. Furthermore, a liquid, containing the polymerizable thiouracil derivative and the radical-polymerizable monomer as main components, and a powder containing the polymerization initiator and the filler as main components are separately wrapped, and can be mixed at the time of using.

Since the adhesive of this invention contains the polymerizable thiouracil derivative, it has an excellent adhesion to a metal, especially, to a noble metal or a noble metal alloy. Furthermore, when the adhesive contains a filler, a hardened body obtained by polymerizing the adhesive has excellent mechanical strength.

The adhesive of this invention is preferred as a dental adhesive material, and it is particularly effective to adhere a tooth to a metallic prosthetic material.

EXAMPLES

The present invention will be described in details by the following examples, but the invention will not be limited to these examples.

Production Example 1

In a 1-liter three-necked flask containing 1,6-hexanediol (47.3 g, 0.40 mol), molecular sieve 3A powder (40 g) and acetonitrile (470 ml) under a nitrogen atmosphere, 30 ml of an acetonitrile solution of methacryloyl chloride (20.9 g, 0.2 mol) was slowly added dropwise at room temperature by using a dropping funnel. After the end of addition, the mixture was heated and refluxed for 5 hours. Thereafter, it was cooled to room temperature, and the molecular sieve 3A powder was filtered from the reaction mixture. From the filtrate, acetonitrile was distilled under reduced pressure. To the residue, 300 ml of methylene chloride was added, and the methylene chloride solution was washed with water. The methylene chloride layer was dried with anhydrous sodium sulfate, and the solvent was distilled under reduced pressure. From this residue, 6-hydroxyhexyl methacrylate (33.3 g) as a colorless transparent liquid was separated and purified by silica gel column chromatography.

N,N'-dicyclohexylcarbodiimide (2.27 g, 11 mmol), 6-hydroxyhexyl methacrylate (5.59 g, 30 mmol), 5-carboxy-2-thiouracil (1.72 g, 10 mmol) and tetrahydrofuran (50 ml) were put in a 200 ml three-necked flask to dissolve them, and the mixture was stirred at room temperature for 3 days. As the reaction proceeded, a white precipitate was formed, but after the end of the reaction, a white precipitate was filtered. From the filtrate, tetrahydrofuran was distilled under reduced pressure. The residue was added to a silica gel column for chromatography. By using a mixed sovent of ethyl acetate red and hexane as developing solvents, 6-methacryloyloxyhexyl 2-thiouracil-5-carboxylate [A] (1.13 g, 3.3 mmol) was obtained. The results of NMR (d6DMSO), MASS and elementary analysis were shown as follows.

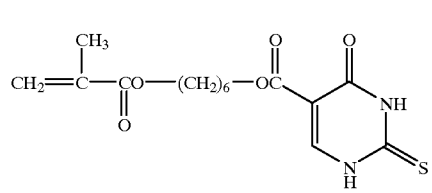

NMR (δ, ppm); 1.3–1.7 (8H, —COO—CH$_2$(CH$_2$)$_4$CH$_2$—OCO—)

1.87 (3H, —CH$_3$)

4.09, 4,13(4H, —COO—CH$_2$(CH$_2$)$_4$CH$_2$—OCO—)

5.65, 6.01 (2H, CH$_2$=C—)

7.94 (1H, —N—CH═C—)

12.7 (2H, —NH—)

MASS (M+1)⁺=341

Elemental analysis; $C_{15}H_{20}N_2O_5S$

|  | C | H | N |
|---|---|---|---|
| Calculated value | 52.93 | 5.92 | 8.23 |
| Found | 52.96 | 5.92 | 8.25 |

Production Example 2

In a 1-liter three-necked flask containing 1,10-decanediol (34.9 g, 0.20 mol), molecular sieve 3A powder (20 g), and tetrahydrofuran (350 ml) under a nitrogen atmosphere, a tetrahydrofuran solution (30 ml) of methacryloyl chloride (10.5 g, 0.1 mol) was added dropwise at room temperature by using a dropping funnel. After the end of addition, the mixture was heated and refluxed for 5 hours. Thereafter, the mixture was cooled to room temperature, and from the reaction mixture, molecular sieve 3A powder was filtered. From the filtrate, tetrahydrofuran was distilled under reduced pressure. To the residue, 300 ml of methylene chloride was added, and the methylene chloride solution was washed with water. The methylene chloride layer was dried over anhydrous sodium sulfate, and the solvent was distilled under reduced pressure. From the residue, 10-hydroxydecyl methacrylate (14.5 g) as a colorless transparent liquid was separated and purified by silica gel column chromatography.

N,N'-dicyclohexylcarbodiimide (2.27 g, 11 mmole), 10-hydroxydecyl methacrylate (7.27 g, 30 mmol), 5-carboxy-2-thiouracil (1.72 g, 10 mmol) and tetrahydrofuran (50 ml) were put in a 200 ml three-necked flask to dissolve them, and the mixture was continuously stirred for 3 days at room temperature. As the reaction proceeded, a white precipitate was produced. After the end of the reaction, the white precipitate was filtered. Thereafter, the same separation and purification treatment as in Production Example 1 was carried out to give 10-methacryloyloxydecyl 2-thiouracil-5-carboxylate [B] (1.15 g, 2.9 mmol). The results of NMR (d6DMSO), MASS and elementary analysis were shown below.

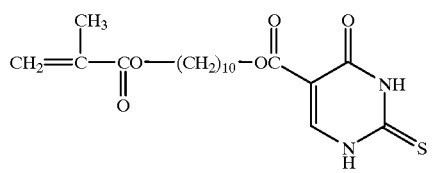
[B]

NMR (δ, ppm); 1.3–1.7 (16H, —COO—CH₂(CH₂)₈CH₂—OCO—)

1.87 (3H, —CH₃)

4.08, 4.13(4H, —COO—CH₂(CH₂)₈CH₂—OCO—)

5.65, 6.01 (2H, CH₂═C—)

7.93 (1H, —N—CH═C—)

12.8 (2H, —NH—)

MASS (M+1)⁺=397

Elemental analysis;$C_{19}H_{28}N_2O_5S$

|  | C | H | N |
|---|---|---|---|
| Calculated value | 57.56 | 7.12 | 7.07 |
| Found | 57.51 | 7.16 | 7.08 |

Production Example 3

In a 1-liter three-necked flask containing an acetonitrile solution (470 ml) of 1,6-hexanediol (47.3 g, 0.40 mol) and a molecular sieve 3A powder (40 g), an acetonitrile solution (30 ml) of acryloyl chloride (18.1 g, 0.2 mol) was slowly added dropwise at room temperature by using a dropping funnel. After the addition, the mixture was heated and refluxed for 5 hours. After the reaction, the same treatment as in Production Example 2 was carried out and then 6-hydroxyhexyl acrylate (28.9 g) as a colorless transparent liquid was separated and purified.

N,N'-dicyclohexylcarbodiimide (2.27 g, 11 mmol), 6-hydroxyhexyl acrylate (5.17 g, 30.0 mmol), 5-carboxy-2-thiouracil (1.72 g, 10 mmol) and tetrahydrofuran (50 ml) were put in a 200 ml three-necked flask and dissolved. The mixture was continuously stirred at room temperature for 3 days. As the reaction proceeded, a white precipitate formed. After the end of the reaction, the white precipitate was filtered. Thereafter, the same separation and purification treatment as in Production Example 1 was carried out to obtain 6-acryloyloxyhexyl 2-thiouracil-5-carboxylate [C] (1.01 g, 3.3 mmol). The results of NMR (d6DMSO), MASS and elementary analysis are shown below.

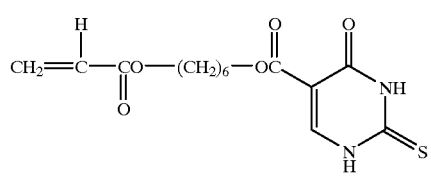
[C]

NMR (δ, ppm); 1.3–1.7 (8H, —COO—CH₂(CH₂)₄CH₂—OCO—)

4.09, 4.13 (4H, —COO—CH₂(CH₂)₄CH₂—OCO—)

5.82, 6.12, 6.45(3H, CH₂═CH—)

7.93 (1H, —N—CH═C—)

12.7 (2H, —NH—)

MASS (M+1)⁺=327

Elemental analysis;$C_{14}H_{18}N_2O_5S$

|  | C | H | N |
|---|---|---|---|
| Calculated value | 51.52 | 5.56 | 8.58 |
| Found | 51.56 | 5.57 | 8.57 |

Production Example 4

In a 300 ml. three-necked flask containing a tetrahydrofuran solution (20 ml) of 60% sodium hydride (1.92 g, 48 mmol) under a nitrogen atmosphere, a tetrahydrofuran solution (30 ml) of 1,6-hexanediol (4.72 g, 40 mmol) was slowly added dropwise at room temperature. Subsequently, a tetrahydrofuran solution (30 ml) of chloromethylstyrene (6.1 g, 40 mmol) was slowly added dropwise. After the end of addition, the solution was heated and refluxed for 4 hours. Thereafter, the solution was cooled to room temperature, and dilute hydrochloric acid was added to the reaction mixture to stop the reaction. The aqueous layer was extracted with ether, and the combined organic layer was washed with an aqueous solution of saturated sodium hydrogencarbonate and a saturated sodium chloride solution. The resulting organic layer was dried with anhydrous magnesium sulfate, and the solvent was distilled under reduced pressure to separate and purify 1-hydroxy-6-(p-vinyl benzyloxy)hexane (7.97 g) by silica gel column chromatography.

N,N'-dicyclohexylcarbodiimide (2.27 g, 11 mmol), 1-hydroxy-6-(p-vinyl benzyloxy)hexane (7.03 g, 30 mmol), 5-carboxy-2-thiouracil (1.72 g, 10 mmol), and tetrahydrofuran (50 ml) were put in a 200 ml. three-necked flask and dissolved. The mixture was continuously stirred at room temperature for 3 days. As the reaction proceeded, a white precipitate was formed. After the end of the reaction, the white precipitate was filtered. Thereafter, the same separation and purification treatment as in Production Example 1 was carried out to give 6-(p-vinylbenzyloxy)hexyl 2-thiouracil-5-carboxylate [D] (1.17 g, 3.0 mmol) shown by the following formula. The results of NMR (d6DMSO), MASS and elementary analysis are shown below.

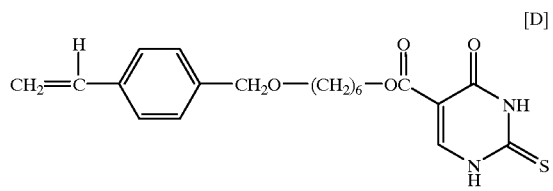

[D]

NMR (δ, ppm); 1.3–1.7 (8H, —COO—CH$_2$(CH$_2$)$_4$CH$_2$—OCH$_2$—)
3.49, 4.1 (4H, —COO—CH$_2$(CH$_2$)$_4$CH$_2$—OCH$_2$—)
4.53 (2H, —OCH$_2$—C$_6$H$_4$)
5.27, 5.84, 6.71 (3H, CH$_2$=CH—)
7.3–7.4 (4H, C$_6$H$_4$)
7.93 (1H, —N—CH=C—)
12.7 (2H, —NH—)
MASS (M+1)$^+$=389
Elemental analysis; C$_{20}$H$_{24}$N$_2$O$_4$S

|  | C | H | N |
|---|---|---|---|
| Calculated value | 61.84 | 6.23 | 7.21 |
| Found | 61.81 | 6.27 | 7.24 |

Production Example 5

In a 1-liter three-necked flask containing 2,2-dimethyl-1,3-propanediol (20.8 g, 0.2 mol), molecular sieve 3A powder (20 g) and tetrahydrofuran (350 ml) under a nitrogen atmosphere, a tetrahydrofuran solution (30 ml) of methacryloyl chloride (10.5 g, 0.1 mol) was slowly added dropwise at room temperature by using a dropping tunnel. After the end of addition, the solution was seated and refluxed for 4 hours. After the reaction, the same treatment as in Production Example 3 was carried out to separate and purify 3-hydroxy-2,2-dimethylpropyl methacrylate (13.1 g).

N,N'-dicyclohexylcarbodiimide (2.27 g, 11 mmol), 3-hydroxy-2,2-dimethyl propyl methacrylate (5.18 g, 30 mmol), 5-carboxy-2-thiouracil (1.72 g, 10 mmol) and tetrahydrofuran (50 ml) were put in a 200 ml three-necked flask and dissolved, and the solution was continuously stirred at room temperature for 3 days. As the reaction proceeded, a white precipitate was formed. After the end of reaction, the white precipitate was filtered. Thereafter, the same separation and purification treatment as in Production Example 1 was carried out to give 3-methacryloyloxy-2,2-dimethylpropyl 2-thiouracil-5-carboxylate [E] (0.91 g, 2.8 mmol) expressed by the following formula. The results of NMR (d6DMSO), MASS and elementary analysis are shown below.

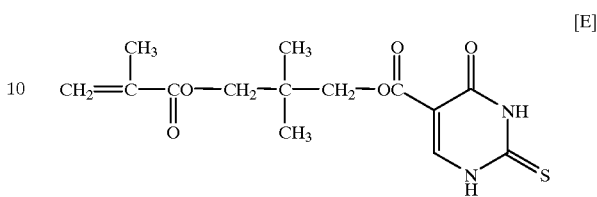

[E]

NMR (δ, ppm); 0.91 (6H, —CH$_2$C(CH$_3$)$_2$CH$_2$—)
1.87 (3H, CH$_2$=C—CH$_3$)
4.1, 4.18 (4H, —COO—CH$_2$C(CH$_3$)$_2$CH$_2$—OCO—)
5.66, 6.02, (2H, CH$_2$=C—)
7.93 (1H, —N—CH=C—)
12.8 (2H, —NH—)
MASS (M+1)$^+$=327
Elemental analysis; C$_{14}$H$_{18}$N$_2$O$_5$S

|  | C | H | N |
|---|---|---|---|
| Calculated value | 51.52 | 5.56 | 8.58 |
| Found | 51.54 | 5.55 | 8.57 |

Production Example 6

In a 1-liter three-necked flask containing p-xyleneglycol (55.2 g, 0.40 mol), molecular sieve 3A powder (40 g) and acetonitrile (470 ml) under a nitrogen atmosphere, an acetonitrile solution (30 ml) of methacryloyl chloride (20.9 g, 0.2 mol) was slowly added dropwise at room temperature by using a dropping funnel. After the addition, the solution was heated and refluxed for 5 hours. Thereafter, the solution was cooled to room temperature, and the molecular sieve 3A was filtered from the reaction mixture. Acetonitrile was distilled under reduced pressure from the filtrate. Methylene chloride (300 ml) was added to the residue, and the methylene chloride solution was washed with water. The methylene chloride layer was dried with anhydrous sodium sulfate, and the solvent was distilled under reduced pressure. From this residue, 4-(hydroxymethyl)benzylmethacrylate (34.8 g) as a white solid was separated and purified by silica gel column chromatography.

N,N'-dicyclohexylcarbodiimide (2.27 g, 11 mmol), 4-(hydroxymethyl)benzyl methacrylate (6.48 g, 30 mmol), 5-carboxy-2-thiouracil (1.72 g, 10 mmol) and tetrahydrofuran (50 ml) were put in a 200 ml. three-necked flask and dissolved, and the solution was continuously stirred at room temperature for 3 days. As the reaction proceeded, a white precipitate was formed, but after the reaction, the white precipitate was filtered. Thereafter, the same separation and purification treatment as in Production Example 1 was carried out to obtain 4-(methacryloyloxymethyl)benzyl 2-thiouracil-5-carboxylate [F] (0.91 g, 2.5 mmol) expressed by the following formula. The results of NMR (d6DMSO), MASS and elementary analysis are shown below.

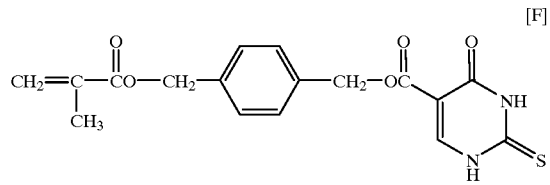

[F]

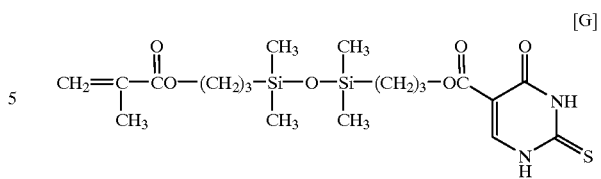

[G]

NMR (δ, ppm); 1.90 (3H, —CH₃—)

5.17, 5.23 (4H, —COO—CH₂—C₆H₄—CH₂—OCO—)

5.70, 6.07 (2H, CH₂=C—)

7.40 (4H, —C₆H₄—)

8.00 (1H, —N—CH=C—)

12.8 (2H, —NH—)

MASS (M+1)⁺=361

Elemental analysis;$C_7H_6N_2O_5S$

|  | C | H | N |
|---|---|---|---|
| Calculated value | 56.66 | 4.47 | 7.77 |
| Found | 56.42 | 4.31 | 7.82 |

Production Example 7

In a 1-liter three-necked flask containing 1,3-bis (hydroxypropyl)tetramethyl disiloxane (100 g, 0.40 mol), molecular sieve 3A powder (40 g) and acetonitrile (470 ml) under a nitrogen atmosphere, an acetonitrile solution (30 ml) of methacryloyl chloride (20.9 g, 0.2 mol) was slowly added dropwise at room temperature by using a dropping funnel. After the end of addition, the solution was heated and refluxed for 5 hours. Thereafter, the solution was cooled to room temperature, and the molecular sieve 3A powder was filtered from the reaction mixture. Acetonitrile was distilled under reduced pressure from the filtrate. Methylene chloride (300 ml) was added to the residue, and the methylene chloride solution was washed with water. The methylene chloride layer was dried with anhydrous sodium sulfate, and the solvent was distilled under reduced pressure. From this residue, 1-(methacryloyloxypropyl)-3-(hydroxypropyl) tetramethyldisiloxane (46.2 g) as a colorless transparent liquid was separated and purified by silica gel column chromatography.

N,N'-dicyclohexylcarbodiimide (2.27 g, 11 mmol), 1-(methacryloyloxypropyl)-3- (hydroxypropyl) tetramethyldisiloxane (9.54 g, 30 mmol), 5-carboxy-2-thiouracil (1.72 g, 10 mmol) and tetrahydrofuran (50 ml) were put in a 200 ml three-necked flask and dissolved, and continuously stirred at room temperature for 3 days. As the reaction proceeded, a white precipitate was formed, and after the end of the reaction, the white precipitate was filtered. Thereafter, the same separation and purification treatment as in Production Example 1 was carried out to give the compound of the following formula [G] (1.13 g, 2.4 mmol). The results of NMR (d6DMSO), MASS and elementary analysis are shown below.

NMR (δ, ppm); 0.06 (12H, —Si—CH₃)
0.51 (4H, —Si—CH₂—CH₂—CH₂—OCO—)
1.69 (4H, —Si—CH₂—CH₂—CH₂—OCO—)
1.87 (3H, —CH₃)
4.23 (4H, —Si—CH₂—CH₂—CH₂—OCO—)
5.67, 6.03 (2H, CH₂=C—)
7.96 (1H, —N—CH=C—)
12.8 (2H, —NH—)
MASS (M+1)⁺=473
Elemental analysis;$C_{19}H_{32}N_2O_6SSi_2$

|  | C | H | N |
|---|---|---|---|
| Calculated value | 48.28 | 6.82 | 5.93 |
| Found | 48.35 | 6.74 | 5.73 |

Production Example 8

In a 1-liter three-necked flask containing an ethanol solution (200 ml) of sodium ethoxide (13.6 g, 0.2 mol), an ethanol solution (50 ml) of diethyl malonate (16.0 g, 0.1 mol) was slowly added dropwise at room temperature by using a dropping funnel. After the end of addition, the solution was heated and refluxed. Subsequently, an ethanol solution (100 ml) of triethyl ortho propionate (17.6 g, 0.1 mol) was slowly added dropwise by using a dropping funnel. After the end of addition, the solution was heated and refluxed for 6 hours. The solution was cooled to room temperature, and ethanol was distilled under reduced pressure. Water (200 ml) was added to the residue, followed by extracting (three times) with ether. The ether layer was washed with a saturated aqueous solution of sodium chloride, and dried with anhydrous magnesium sulfate, and concentrated. The residue was distilled under reduced pressure to obtain diethyl 1-ethoxy-1-ethylmethylenemalonate (17.2 g).

In a 500 ml, three-necked flask containing an ethanol solution (50 ml) of sodium ethoxide (3.4 g, 0.05 mol), an ethanol solution (50 ml) of diethyl 1-ethoxy-1-ethylmethylenemalonate (12.2 g, 0.05 mol) was slowly added dropwise at room temperature by using a dropping funnel. After the end of addition, the solution was heated and refluxed. Subsequently, an ethanol solution (50 ml) of thiourea (3.8 g, 0.05 mol) was slowly added dropwise to the resulting solution at the room temperature by using a dropping funnel. After the end of addition, the solution was heated and refluxed for 3 hours. The solution was cooled to room temperature, and the reaction mixture was added to a beaker containing water (200 ml). When concentrated hydrochloric acid was added to the resulting solution, a pale yellow solid was precipitated. The precipitated solid was filtered to give ethyl 6-ethyl-2-thiouracil-5-carboxylate (7.3 g).

Potassium tert-butoxide (43.7 g, 389 mmol) and dimethyl sulfoxide (400 ml) were placed in a 2-liter eggplant type flask and dissolved. To this solution, ethyl 6-ethyl-2-thiouracil-5-carboxylate (5.70 g, 25.0 mmol) was slowly added dropwise, and the solution was reacted at room temperature for 1 hour. After the end of the reaction, methanol (500 ml) was added to the reaction mixture, and the precipitated filtrate was filtered. The resulting precipitate was dissolved in water, and hydrochloric acid was added to the aqueous solution to obtain 5-carboxy-6-ethyl-2-thiouracil (3.10 g).

N,N'-dicyclohexylcarbodiimide (2.27 g, 11 mmol), 6-hydroxyhexyl methacrylate (5.59 g, 30 mmol), 5-carboxy-6-ethyl-2-thiouracil (2.00 g, 10 mmol) and tetrahydrofuran (50 ml) were put in a 200 ml three-necked flask and dissolved, and continuously stirred at room temperature for 3 days. As the reaction proceeded, a white precipitate was formed, and after the end of the reaction, the white precipitate was filtered. Thereafter, the same separation and purification treatment as in Production Example 1 was carried out to give 6-methacryloyloxy hexyl 6-ethyl-2-thiouracil-5-carboxylate [H] expressed by the following formula (1.14 g, 3.10 mmol). The results of NMR (d6DMSO), MASS and elementary analysis are shown below.

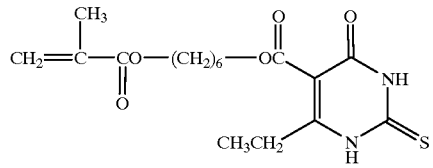

[H]

NMR (δ, ppm); 1.02 (3H, —CH$_2$CH$_3$)
  1.3–1.7 (8H, —COO—CH$_2$(CH$_2$)$_4$CH$_2$—OCO—)
  1.87 (3H, C=C—CH$_3$)
  2.05 (2H, —CH$_2$CH$_3$)
  4.09, 4.13 (4H, —COO—CH$_2$(CH$_2$)$_4$CH$_2$—OCO—)
  5.65, 6.01 (2H, CH$_2$=O—)
  12.5 (2H, —NH—)
  MASS (M+1)$^+$=369
  Elemental analysis; C$_{17}$H$_{24}$N$_2$O$_5$S

|  | C | H | N |
| --- | --- | --- | --- |
| Calculated value | 55.42 | 6.57 | 7.60 |
| Found | 55.42 | 6.59 | 7.63 |

Production Example 9

In a 1-liter three-necked flask containing an ethanol solution (200 ml) of sodium ethoxide (13.6 g, 0.20 mol), an ethanol solution (100 ml) of diethyl 2-methyl-2'-oxosuccinate (40.4 g, 0.20 mol) was slowly added dropwise at room temperature by using a dropping funnel. After the end of addition, the solution was heated and refluxed. Subsequently, an ethanol solution (100 ml) of methylthiourea (18.0 g, 0.2 mol) was slowly added dropwise by using a dropping funnel. After the end of addition, the solution was heated and refluxed for 3 hours. The solution was cooled to room temperature, and the reaction mixture was added to a beaker containing 500 ml of water. When concentrated hydrochloric acid was added to the resulting solution, a pale yellow solid was precipitated. The precipitated solid was filtered, and by separating and purifying the precipitated solid by using column chromatography, ethyl 3,5-dimethyl-2-thiouracil-6-carboxylate (16.2 g) was obtained.

Potassium tert-butoxide (43.7 g, 389 mmol) and dimethyl sulfoxide (400 ml) were placed in a 2-liter eggplant-type flask and dissolved. To this solution, ethyl 3,5-dimethyl-2-thiouracil-6-carboxylate (5.70 g, 25.0 mmol) was slowly added dropwise, and the solution was reacted at room temperature for 1 hour. After the end of the reaction, 500 ml of methanol was added to the reaction mixture, and the precipitated matter was filtered. The precipitated matter was dissolved in water and hydrochloric acid was added to the aqueous solution to give 6-carboxy-3,5-dimethyl-2-thiouracil (2.88 g) as a pale yellow solid.

N,N'-dicyclohexylcarbodiimide (2.27 g, 11 mmol), 6-hydroxyhexyl methacrylate (5.59 g, 30 mmol), 6-carboxy-3,5-dimethyl-2-thiouracil (2.00 g, 10 mmol) and tetrahydrofuran (50 ml) were put in a 200 ml three-necked flask and dissolved, and the solution was continously stirred at room temperature for 3 days. As the reaction proceeded, a white precipitate was formed, but after the end of the reaction, the white precipitate was filtered. Thereafter, the same separation and purification treatment as in Production Example 1 was carried out to give 6-methacryloyloxyhexyl 3,5-dimethyl-2-thiouracil-6-carboxylate [I] (1.13 g, 3.07 mmol) represented by the following formula. The results of NMR (d6DMSO), MASS and elementary analysis are shown below.

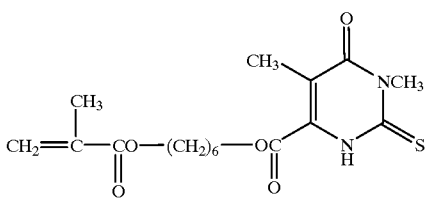

[I]

NMR (δ, ppm); 1.3–1.7 (8H, —COO—CH$_2$(CH$_2$)$_4$CH$_2$—OCO—)
  1.87 (3H, CH$_2$=C—CH$_3$)
  2.36 (3H, C=C—CH$_3$)
  3.68 (3H, N—CH$_3$)
  4.09, 4.13 (4H, —COO—CH$_2$(CH$_2$)$_4$CH$_2$—OCO—)
  5.65, 6.01 (2H, CH$_2$=C—)
  12.3 (1H, —NH—)
  MASS (M+1)$^+$=369
  Elemental analysis; C$_{17}$H$_{24}$N$_2$O$_5$S

|  | C | H | N |
| --- | --- | --- | --- |
| Calculated value | 55.42 | 6.57 | 7.60 |
| Found | 55.48 | 6.54 | 7.61 |

Abbreviations or structures used for the compounds described in the following Examples or Comparative Examples given below will be shown as follows:

(1) Abbreviations or structures
  MAC-10: 11-Methacryloyloxy-1,1-undecanedicarboxylic acid
  PM2: bis(2-methacryloyloxyethyl) hydrogenphosphate
  4-META: 4-methacryloyloxyethyltrimellitate anhydride
  AMPS: 2-acrylamide-2-methylsulfonic acid
  3G; triethyleneglycol dimethacrylate
  D-2. 6E: 2,2-bis(4-(methacryloyloxyethoxy)phenyl) propane
  NPG: neopentylglycol dimethacrylate
  BPO: benzoyl peroxide
  DMPT: N,N-dimethyl-p-toluidine
  DEPT: N,N-dihydroxyethyl-p-toluidine
  PBNa: sodium tetraphenylborate
  PTSNa: sodium p-toluenesulfinate CQ: camphorquinone
DMBE: ethyl 4-dimethylaminobenzoate
DMEM: N,N-dimethylaminoethyl methacrylate
DMA: p-dimethylaminoacetophenone F1: a filler obtained by surface-treating a quartz powder (a non-spherical pulverized product) having an average particle diameter of 9 μm with γ-methacryloyloxypropyltrimethoxysilane.

F2: a filler obtained by surface-treating a spherical silica-zirconia having an average particle diameter of 0.2 μm with γ-methacryloyloxypropyl-trimethoxysilane.

F3: an inorganic organic composite filler having an average particle diameter of 20 μm obtained by pulverizing the hardened product which is obtained by heat-curing the paste using azobisisobutyronitrile as a catalyst which consists of 200 parts by weight of F2 and a mixed solution of 60 parts by weight of bis-GMA and 40 parts by weight of 3G.

F4: an organic filler having an average particle diameter of 50 μm obtained by pulverizing polymethyl methacrylate.

[A]
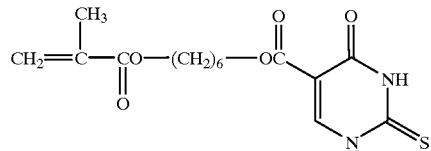

[B]
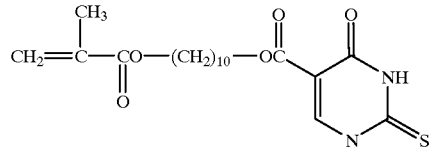

[C]
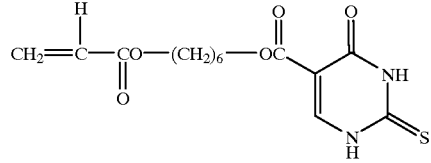

[D]
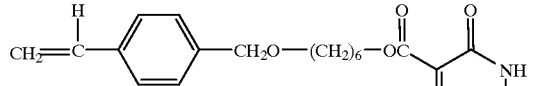

[E]
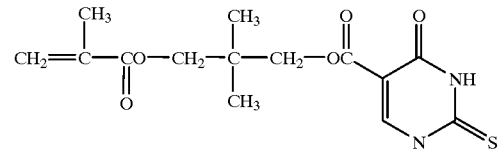

[F]
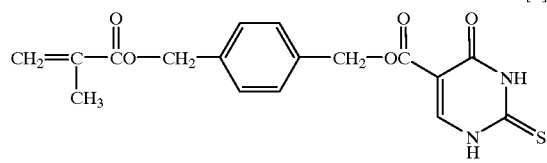

[G]
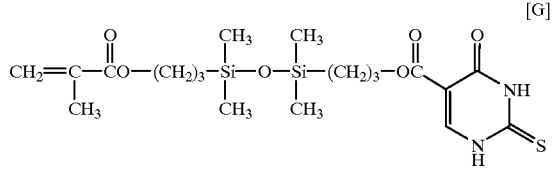

[H]
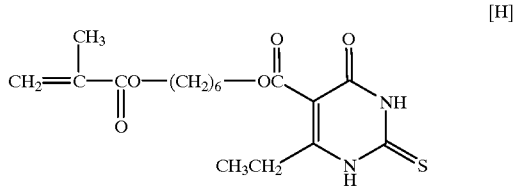

[I]
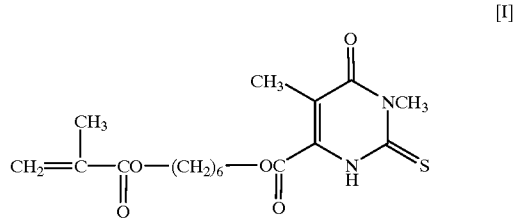

(2) Adhesive strength to a pure gold and a dental noble metal alloy

A dental gold-silver-palladium alloy "KINPARA 12" (made by Towa Giken Co. Ltd. 10×10×3 mm) and a pure gold plate (10×10×3 mm), which were materials to be adhered, were polished with #1500 water-resistant polishing paper and then sandblasted. To the treated surface, an adhesive tape having a hole of 4 mmφ was pasted to fix an adhering area. To this surface, the adhesives of Examples or Comparative Examples were directly fulfilled. Thereafter, pure silver round rods having a size of 8 mmφ×18 mm (Examples 1 to 2) or SUS 304 round rods (Examples 3 to 28 and Comparative Examples 1 to 3) which were sandblasted in advance were pressed against the adhesive surface to perform adhesion. The excessive adhesives were removed. After one hour, the adhesive test piece was immersed in water at 37° C. After 24 hours, the tensile adhesive strength was measured by using an autograph (cross head speed 10 mm/min.) made by Shimadzu Seisakusho Ltd. The measured values of 6 test pieces were averaged, and the measuring results were expressed.

EXAMPLE 1

A composition A composed of 0.02 g of thiouracil derivative A, 10 g of 2,2-bis-(4-(methacryloyloxyethoxy)phenyl) propane (D-2.6E), 0.2 g of benzoyl peroxide and 0.2 g of camphorquinone, and a composition B composed of 10 g of 2,2-bis(4-(methacryloyloxyethoxy)phenyl)propane (D-2.6E), 0.2 g of N,N-dimethyl-p-toluidine (DMPT), and 0.2 g of N,N-dimethylaminoethyl methacrylate (DMEM) were separately prepared. Immediately before use, the compositions A and B were kneaded in a weight ratio of 1:1 to form an adhesive. The adhesive strength to the pure gold and the dental noble metal alloy "KINPARA 12" was measured. As a result, the adhesive had a high adhesive strength of 20.5 MPa to the pure gold and a high adhesive strength of 21.7 MPa to the KINPARA 12.

EXAMPLES 2 to 28

The composition A and the composition B having the compositions shown in Tables 1 and 2 were prepared in the same way as in Example 1. Immediately before use, the compositions A and B were kneaded at a weight ratio of 1:1 to prepare adhesive compositions shown in Tables 3 and 4. The adhesive strengths to the pure gold, and the dental noble metal alloys "KINPARA 12" were measured. The results are shown in Tables 3 and 4, and any compositions showed high adhesive strengths.

COMPARATIVE EXAMPLES 1 TO 3

The composition A and the composition B shown in Table 5 in Example 1 were prepared in the same way as in Example 1. Immediately before use, the composition A and the composition B were kneaded in a weight ratio of 1:1 to form adhesive composition as shown in Table 6, and the adhesive strengths to the pure gold and the dental noble metal alloy "tKINPARA 12" were measured. As a result, as shown in Table 6, in an Example wherein the thiouracil derivative was not added (Comparative Example 1), the adhesive strength to any metal was lowered. Furthermore, when the radical-polymerizable monomer was not added (Comparative Example 2), both compositions were powders, and the adhesion test was impossible. Furthermore, when a polymerization initiator was not added (Comparative Example 3), the resulting adhesive was not hardened, and therefore the adhesive strengths to any metal were 0 MPa.

TABLE 1

| | Composition A (parts by weight) | | | | | Composition B (parts by weight) | | | |
| | Radical-polymerizable monomer | | | | | | | | |
| | Thiouracil derivative | Acidic group-containing polymerizable monomer | Other polymerizable monomer | Polymerization initiator | Filler | Thiouracil derivative | Radical-polymerizable monomer | Polymerization initiator | Filler |
|---|---|---|---|---|---|---|---|---|---|
| Ex.1 | A (0.2) | — | D-2.6E (100) | BPO + CQ (2) + (2) | — | — | D-2.6E (100) | DMPT + DMEM (2) + (2) | — |
| Ex.2 | A (0.2) | — | D-2.6E (100) | BPO (2) | — | — | 3G (100) | DEPT (2) | — |
| Ex.3 | A (0.2) | MAC-10 + PM2 (30) + (30) | D-2.6E (40) | BPO + CQ (2) + (2) | — | — | D-2.6E (100) | DMPT + DMA (2) + (2) | — |
| Ex.4 | A (30) | MAC-10 (50) | D-2.6E (50) | — | — | — | D-2.6E + 3G (60) + (40) | PBNa (20) | — |
| Ex.5 | A (2.0) | MAC-10 (40) | D-2.6E (60) | BPO + CQ (2) + (2) | F1 + F2 (200) + (200) | — | D-2.6E (2) + (2) | DMPT + DMEM (200) + (200) | F1 + F2 |
| Ex.6 | A (2.0) | MAC-10 (30) | D-2.6E (70) | BPO (2) | F1 + F2 (200) + (200) | — | D-2.6E (2) | DEPT (200) + (200) | F1 + F2 |
| Ex.7 | A (1.0) | MAC-10 (60) | 3G (40) | BPO (2) | F1 + F2 (200) + (200) | — | 3G (2) + (2) | DMPT + PTSNa (200) + (200) | F1 + F2 |
| Ex.8 | A (1.0) | MAC-10 (80) | D-2.6E (20) | BPO + CQ (2) + (2) | F1 (350) | — | 3G + NPG (60) + (40) | DMPT + DMBE (2) + (2) | F1 (350) |
| Ex.9 | A (1.0) | PM2 (80) | D-2.6E (20) | BPO + CQ (1) + (1) | F1 + F2 (150) + (150) | — | D-2.6E + NPG (40) + (60) | DMPT + DMEM (1) + (1) | F1 + F2 (150) + (150) |
| Ex.10 | A (2.0) | 4-META (80) | D-2.6E (20) | BPO + CQ (2) + (2) | F2 (400) | — | D-2.6E (2) + (2) + (2) | DMPT + DMEM + PTSNa (400) | F2 |
| Ex.11 | A (5.0) | AMPS (30) | NPG (70) | BPO + CQ (2) + (2) | F1 + F2 (200) + (200) | A (5.0) | NPG (100) | DEPT + DMBE + PBNa (2) + (2) + (2) | F1 + F2 (200) + (200) |
| Ex.12 | — | MAC-10 (60) | NPG (40) | — | F1 + F2 (200) + (200) | A (15) | NPG (100) | PBNa (15) | F1 + F2 (200) + (200) |
| Ex.13 | — | MAC-10 + PM2 (10) + (40) | D-2.6E (50) | — | F1 (3) | A (0.2) | D-2.6E (100) | PBNa (1) | F1 (3) |
| Ex.14 | — | MAC-10 + AMPS (70) + (10) | D-2.6E (20) | — | F1 + F2 (200) + (250) | A (2.0) | D-2.6E (100) | PBNa (6) | F1 + F2 (200) + (250) |

TABLE 2

| | Composition A (parts by weight) | | | | | Composition B (parts by weight) | | | |
| | Radical-polymerizable monomer | | | | | | | | |
| | Thiouracil derivative | Acidic group-containing polymerizable monomer | Other polymerizable monomer | Polymerization initiator | Filler | Thiouracil derivative | Radical-polymerizable monomer | Polymerization initiator | Filler |
|---|---|---|---|---|---|---|---|---|---|
| Ex.15 | A (4.0) | MAC-10 (50) | D-2.6E (50) | BPO (2) | F1 + F2 (300) + (300) | — | D-2.6E (100) | DMPT + PTSNa (2) + (2) | F1 + F2 (300) + (300) |
| Ex.16 | B (2.0) | MAC-10 (80) | D-2.6E (20) | BPO + CQ (2) + (2) | F1 + F2 (300) + (300) | — | D-2.6E + NPG (40) + (60) | DMPT + DMEM (2) + (2) | F1 + F2 (300) + (300) |

TABLE 2-continued

| | | Composition A (parts by weight) | | | | | Composition B (parts by weight) | | |
|---|---|---|---|---|---|---|---|---|---|
| | | Radical-polymerizable monomer | | | | | | | |
| | Thiouracil derivative | Acidic group containing polymerizable monomer | Other polymerizable monomer | Polymerization initiator | Filler | Thiouracil derivative | Radical-polymerizable monomer | Polymerization initiator | Filler |
| Ex.17 | C (0.6) | MAC-10 (60) | D-2.6E (40) | BPO (2) | F3 (450) | — | NPG (100) | DEPT (2) | F3 (450) |
| Ex.18 | C (2.0) | MAC-10 (40) | D-2.6E (60) | BPO + CQ (2) + (2) | F1 + F2 (300) + (300) | — | D-2.6E + 3G (40) + (60) | DMPT + DMBE (2) + (2) | F1 + F2 (300) + (300) |
| Ex.19 | C (20) | MAC-10 (80) | NPG (20) | BPO (2) | F1 + F2 (200) + (200) | — | NPG (100) | DEPT (2) | F1 + F2 (200) + (200) |
| Ex.20 | D (1.0) | MAC-10 (60) | D-2.6E (40) | BPO (0.2) | F4 (400) | — | D-2.6E + NPG (40) + (60) | DMPT + PBNa (0.2) + (0.2) | F4 (400) |
| Ex.21 | E (2.0) | MAC-10 (60) | D-2.6E (40) | BPO (2) | F1 + F2 (250) + (250) | — | D-2.6E + NPG (20) + (80) | DMPT + PTSNa (2) + (2) | F1 + F2 (250) + (250) |
| Ex.22 | F (1.0) | MAC-10 (40) | D-2.6E (60) | BPO + CQ (2) + (2) | F1 + F2 (300) + (300) | — | D-2.6E (100) | DMPT + DMEM (2) + (2) | F1 + F2 (300) + (300) |
| Ex.23 | F (2.0) | MAC-10 + PM2 (20) + (40) | D-2.6E (40) | BPO (1) | F3 (450) | — | D-2.6E + NPG (50) + (50) | DEPT (1) | F3 (450) |
| Ex.24 | F (4.0) | MAC-10 (60) | D-2.6E (40) | BPO (2) | F1 + F2 (250) + (250) | — | D-2.6E (100) | DMPT + PTSNa (2) + (2) | F1 + F2 (250) + (250) |
| Ex.25 | F (1.0) | PM2 + 4-META (40) + (10) | D-2.6E (50) | — | F1 + F2 (200) + (200) | — | D-2.6E + NPG (70) + (30) | PBNa (6) | F1 + F2 (200) + (200) |
| Ex.26 | G (2.0) | PM2 (80) | D-2.6E (20) | BPO + CQ (2) + (2) | F1 + F2 (300) + (300) | — | D-2.6E + 3G (20) + (80) | DEPT + DMBE (2) + (2) | F1 + F2 (300) + (300) |
| Ex.27 | H (2.0) | MAC-10 (70) | D-2.6E (30) | BPO + CQ (2) + (2) | F1 + F2 (200) + (200) | — | D-2.6E (100) | DEPT + DMEM + PTSNa (2) + (2) + (2) | F1 + F2 (200) + (200) |
| Ex.28 | I (0.2) | MAC-10 + AMPS (20) + (10) | D-2.6E (70) | BPO (2) | F1 (5) | — | D-2.6E + NPG (20) + (80) | DMPT + PBNa (2) + (4) | F1 (5) |

TABLE 3

| | | Final composition (parts by weight) | | | | Adhesive strength/MPa | |
|---|---|---|---|---|---|---|---|
| | | Radical-polymerizable monomer | | | | | |
| | Thiouracil derivative | Acidic group containing polymerizable monomer | Other polymerizable monomer | Polymerization initiator | Filler | Pure gold | KINPARA 12 |
| Ex.1 | A (0.1) | — | D-2.6E (100) | BPO + CQ + DMPT + DMEM (1) + (1) + (1) + (1) | — | 20.5 | 21.7 |
| Ex.2 | A (0.1) | — | D-2.6E + 3G (50) + (50) | BPO + DEPT (1) + (1) | — | 19.7 | 20 |
| Ex.3 | A (0.1) | MAC-10 + PM2 (15) + (15) | D-2.6E (70) | BPO + CQ + DMPT + DMA (1) + (1) + (1) + (1) | — | 20 | 19.9 |
| Ex.4 | A (15.0) | MAC-10 (25) | D-2.6E + 3G (55) + (20) | PBNa (10) | — | 18.5 | 18.7 |
| Ex.5 | A (1.0) | MAC-10 (20) | D-2.6E (80) | BPO + CQ + DMPT + DMEM (1) + (1) + (1) + (1) | F1 + F2 (200) + (200) | 25.7 | 26.7 |
| Ex.6 | A (1.0) | MAC-10 (15) | D-2.6E (85) | BPO + DEPT (1) + (1) | F1 + F2 (200) + (200) | 24.8 | 25.9 |
| Ex.7 | A (0.5) | MAC-10 (30) | 3G (70) | BPO + DMPT + PTSNa (1) + (1) + (1) | F1 + F2 (200) + (200) | 25.1 | 25.8 |
| Ex.8 | A (0.5) | MAC-10 (40) | D-2.6E + 3G + NPG (10) + (30) + (20) | BPO + CQ + DMPT + DMEE (1) + (1) + (1) + (1) | F1 (350) | 24.8 | 24.6 |
| Ex.9 | A (0.5) | PM2 (40) | D-2.6E + NPG (30) + (30) | BPO + CQ + DMPT + DMEM (0.5) + (0.5) + (0.5) + (0.5) | F1 + F2 (150) + (150) | 22.9 | 23 |
| Ex.10 | A (1.0) | 4-META (40) | D-2.6E (60) | BPO + CQ + DMPT + DMEM + PTSNa (1) + (1) + (1) + (1) + (1) | F2 (400) | 23.9 | 23.7 |
| Ex.11 | A (5.0) | AMPS (15) | NPG (85) | BPO + CQ + DEPT + DMBE + PBNa (1) + (1) + (1) + (1) + (1) | F1 + F2 (200) + (200) | 22.6 | 21.9 |
| Ex.12 | A (7.5) | MAC-10 (30) | NPG (70) | PBNa (7.5) | F1 + F2 (200) + (200) | 21.9 | 20.7 |
| Ex.13 | A (0.1) | MAC-10 + PM2 (5) + (20) | D-2.6E (75) | PBNa (0.5) | F1 (3) | 21.1 | 20.9 |

TABLE 3-continued

| | | Final composition (parts by weight) | | | | | |
|---|---|---|---|---|---|---|---|
| | | Radical-polymerizable monomer | | | | | Adhesive strength/ MPa |
| | Thio-uracil deriv-ative | Acidic group containing polymerizable monomer | Other polymerizable monomer | Polymerization initiator | Filler | Pure gold | KINPARA 12 |
| Ex.14 | A (1.0) | MAC-10 + AMPS (35) + (5) | D-2.6E (60) | PBNa (3) | F1 + F2 (200) + (250) | 24.6 | 25.3 |

TABLE 4

| | | Final composition (parts by weight) | | | | | |
|---|---|---|---|---|---|---|---|
| | | Radical-polymerizable monomer | | | | | Adhesive strength/ MPa |
| | Thio-uracil deriv-ative | Acidic group containing polymerizable monomer | Other polymerizable monomer | Polymerization initiator | Filler | Pure gold | KINPARA 12 |
| Ex.15 | A (2.0) | MAC-10 (25) | D-2.6E (75) | BPO + DMPT + PTSNa (1) + (1) + (1) | F1 + F2 (300) + (300) | 25.1 | 25.3 |
| Ex.16 | B (1.0) | MAC-10 (40) | D-2.6E + NPG (30) + (30) | BPO + CQ + DMPT + DMEM (1) + (1) + (1) + (1) | F1 + F2 (300) + (300) | 25.8 | 26.8 |
| Ex.17 | C (0.3) | MAC-10 (30) | D-2.6E + NPG (20) + (50) | BPO + DEPT (1) + (i) | F3 (450) | 23.9 | 22.9 |
| Ex.18 | C (1.0) | MAC-10 (20) | D-2.6E + 3G (50) + (30) | BPO + CQ + DMPT + DMBE (1) + (1) + (1) + (1) | F1 + F2 (300) + (300) | 24.3 | 25 |
| Ex.19 | C (10) | MAC-10 (40) | NPG (60) | BPO + DEPT (1) + (1) | F1 + F2 (200) + (200) | 20.5 | 21.3 |
| Ex.20 | D (0.5) | MAC-10 (30) | D-2.6E + NPG (40) + (30) | BPO + DMPT + PBNa (0.1) + (0.1) + (0.1) | F4 (400) | 20.5 | 21.1 |
| Ex.21 | E (1.0) | MAC-10 (30) | D-2.6E + NPG (30) + (40) | BPO + DMPT + PTSNa (1) + (1) + (1) | F1 + F2 (250) + (250) | 24.8 | 24.7 |
| Ex.22 | F (0.5) | MAC-10 (20) | D-2.6E (80) | BPO + CQ + DMPT + DMEM (1) + (1) + (1) + (1) | F1 + F2 (300) + (300) | 22.3 | 23.1 |
| Ex.23 | F (1.0) | MAC-10 + PM2 (10) + (20) | D-2.6E + NPG (45) + (25) | BPO + DEPT (0.5) + (0.5) | F3 (450) | 24.8 | 25.3 |
| Ex.24 | F (2.0) | MAC-10 (30) | D-2.6E (70) | BPO + DMPT + PTSNa (1) + (1) + (1) | F1 + F2 (250) + (250) | 24.1 | 25.1 |
| Ex.25 | F (0.5) | PM2 + 4-META (20) + (5) | D-2.6E + NPG (60) + (15) | PBNa (3) | F1 + F2 (200) + (200) | 23.9 | 24.8 |
| Ex.26 | G (1.0) | PM2 (40) | D-2.6E + 3G (20) + (40) | BPO + CQ + DEPT + DMBE (1) + (1) + (1) + (1) | F1 + F2 (300) + (300) | 23.3 | 22.9 |
| Ex.27 | H (1.0) | MAC-10 (35) | D-2.6E (65) | BPO + CQ + DEPT + DMEM + PTSNa (1) + (1) + (1) + (1) + (1) | F1 + F2 (200) + (200) | 24.6 | 25.6 |
| Ex.28 | I (0.1) | MAC-10 + AMPS (10) + (5) | D-2.6E + NPG (45) + (40) | BPO + DMPT + PBNa (1) + (1) + (2) | F1 (5) | 22.3 | 21.8 |

TABLE 5

| | Composition A (parts by weight) | | | | | Composition B (parts by weight) | | | |
|---|---|---|---|---|---|---|---|---|---|
| | Radical-polymerizable monomer | | | | | | | | |
| | Thio-uracil deriv-ative | Acidic group-containing polymerizable monomer | Other polymer-izable monomer | Polymer-ization initiator | Filler | Thio-uracil deriv-ative | Radical-polymer-izable monomer | Polymeriza-tion initiator | Filler |
| Comp. Ex.1 | — | MAC-10 (40) | D-2.6E (60) | BPO + CQ (2) + (2) | F1 + F2 (250) + (250) | — | D-2.6E (100) | DMPT + DMEM (2) + (2) | F1 + F2 (250) + (250) |

TABLE 5-continued

| | Composition A (parts by weight) | | | | | Composition B (parts by weight) | | | |
|---|---|---|---|---|---|---|---|---|---|
| | | Radical-polymerizable monomer | | | | | | | |
| | Thiouracil derivative | Acidic group-containing polymerizable monomer | Other polymerizable monomer | Polymerization initiator | Filler | Thiouracil derivative | Radical-polymerizable monomer | Polymerization initiator | Filler |
| Comp. Ex.2 | A (0.2) | — | — | BPO + CQ (2) + (2) | F1 + F2 (250) + (200) | — | — | DEPT + DMBE (2) + (2) | F1 + F2 (250) + (200) |
| Comp. Ex.3 | A (0.2) | MAC-10 (40) | D-2.6E (60) | — | F1 + F2 (250) + (250) | — | D-2.6E (100) | — | F1 + F2 (250) + (250) |

TABLE 6

| | Final composition (parts by weight) | | | | | Adhesive strength/ MPa | |
|---|---|---|---|---|---|---|---|
| | | Radical-polymerizable monomer | | | | | |
| | Thiouracil derivative | Acidic group containing polymerizable monomer | Other polymerizable monomer | Polymerization initiator | Filler | Pure gold | KINPARA 12 |
| Comp. Ex.1 | — | MAC-10 (20) | D-2.6E (80) | BPO + CQ + DMPT + DMEM (1) + (1) + (1) + (1) | F1 + F2 (250) + (250) | 12.3 | 10.9 |
| Comp. Ex.2 | A (0.1) | — | — | BPO + CQ + DEPT + DMBE (1) + (1) + (1) + (1) | F1 + F2 (250) + (200) | 0 | 0 |
| Comp. Ex.3 | A (0.1) | MAC-10 (20) | D-2.6E (80) | — | F1 + F2 (250) + (250) | 0 | 0 |

What is claimed is:

1. An adhesive comprising an unsaturated thiouracil derivative represented by the general formula (I)

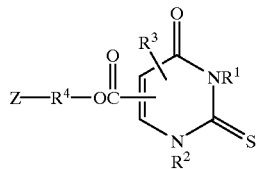
(I)

wherein $R^1$ and $R^2$ each represent a hydrogen atom or an alkyl group, and at least one of $R^1$ and $R^2$ is a hydrogen atom, $R^3$ is a hydrogen atom, an alkyl group or a phenyl group, $R^4$ is a divalent organic residue having 1 to 20 carbon atoms and Z represents an organic group having a radical-polymerizable unsaturated bond, a radical-polymerizable monomer and a polymerization initiator.

2. An adhesive according to claim 1 wherein the unsaturated thiouracil derivative expressed by the general formula (I) is an unsaturated thiouracil derivative represented by the general formula (I-1)

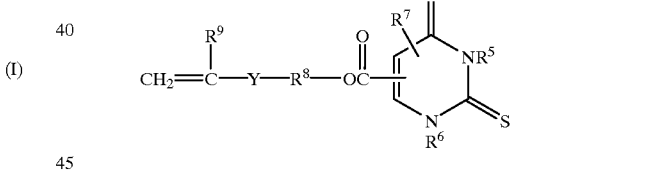
(I-1)

wherein R5 and R6 each represent a hydrogen atom or an alkyl group, at least one of $R^5$ and $R^6$ represent a hydrogen atom, $R^7$ represents a hydrogen atom, an alkyl group or a phenyl group, and $R^8$ represents a divalent saturated hydrocarbon group having 2 to 12 carbon atoms or a group represented by the general formula (a), (b) or (c)

(b)
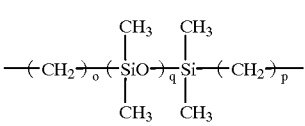

(c)
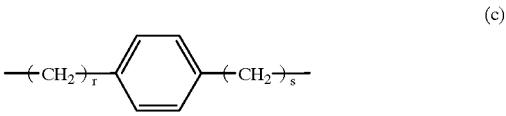

where n is an integer of 1 to 5, o and p are an integer of 1 to 10, q is an integer of 1 to 5, and r and s are an integer of 1 to 5, and wherein $R^9$ represents a hydrogen atom or a methyl group, and Y is —COO— group, —CH$_2$O— group or

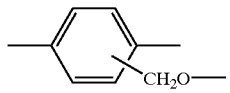

group.

3. An adhesive according to claim 1 wherein the adhesive further comprises a filler.

4. An adhesive according to claim 3 wherein the compounding amount of the filler is 100 to 1200 parts by weight per 100 parts by weight of the radical-polymerizable monomer.

5. An adhesive according to claim 1 wherein the radical-polymerizable monomer contains 10 to 50 parts by weight of a polymerizable monomer having an acidic group.

6. An adhesive according to claim 5 wherein the polymerizable monomer having an acidic group is a (meth) acrylic polymerizable monomer having a carboxylic acid group or a phospholic acid group as the acidic group.

7. An adhesive according to claim 1 wherein the compounding amount of the unsaturated thiouracil derivative is 0.005 to 30 parts by weight per 100 parts by weight of the radical-polymerizable monomer.

8. A dental adhesive composition comprising an unsaturated thiouracil derivative represented by the general formula (I)

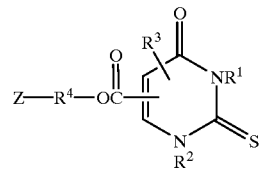

wherein $R^1$ and $R^2$ each represent a hydrogen atom or an alkyl group, and at least one of $R^1$ and $R^2$ is a hydrogen atom, $R^3$ is a hydrogen atom, an alkyl group or a phenyl group, $R^4$ is a divalent organic residue having 1 to 20 carbon atoms, and Z represents an organic group having a radical-polymerizable unsaturated bond, wherein Z is a member selected from the group consisting of methacryloyloxy group, acryloyloxy group, 4-vinylbenzyloxy group, styryl group, allyloxy group, and allyl group, and a radical-polymerizable monomer, a polymerization initiator and a filler.

9. A dental adhesive composition according to claim 8 wherein the amount of the filler is 300 to 1000 parts by weight per 100 parts by weight of the radical-polymerizable monomer.

10. A dental adhesive composition according to claim 9, wherein Z is a member selected from the group consisting of methacryloyloxy group and acryloyloxy group.

* * * * *